(12) United States Patent
Li et al.

(10) Patent No.: US 11,702,373 B2
(45) Date of Patent: Jul. 18, 2023

(54) GYPSUM WALLBOARD WITH ENHANCED FIRE RESISTANCE, AND RELATED COATINGS AND METHODS

(71) Applicant: United States Gypsum Company, Chicago, IL (US)

(72) Inventors: Qinghua Li, Rolling Meadows, IL (US); Naser Aldabaibeh, Homer Glen, IL (US); Mark Hemphill, Hawthorn Woods, IL (US); Trevor Rische, Burlington, WI (US); Suman Sinha Ray, Chicago, IL (US)

(73) Assignee: United States Gypsum Company, Chicago, IL (US)

( * ) Notice: Subject to any disclaimer, the term of this patent is extended or adjusted under 35 U.S.C. 154(b) by 610 days.

(21) Appl. No.: 16/804,936

(22) Filed: Feb. 28, 2020

(65) Prior Publication Data

US 2020/0392050 A1   Dec. 17, 2020

Related U.S. Application Data

(60) Provisional application No. 62/862,493, filed on Jun. 17, 2019.

(51) Int. Cl.
*C04B 41/50*  (2006.01)
*B28B 19/00*  (2006.01)
(Continued)

(52) U.S. Cl.
CPC .......... *C04B 41/5024* (2013.01); *B28B 11/04* (2013.01); *B28B 11/14* (2013.01);
(Continued)

(58) Field of Classification Search
None
See application file for complete search history.

(56) References Cited

U.S. PATENT DOCUMENTS 3,306,765 A   2/1967   De Fresne et al.
3,573,947 A   4/1971   Kinkade et al.
(Continued)

FOREIGN PATENT DOCUMENTS

EP   0258064 A2   3/1988
EP   0543349 A1   5/1993
(Continued)

OTHER PUBLICATIONS

European Patent Office, International Search Report in International Application No. PCT/US2020/036608 (dated Sep. 17, 2020).
(Continued)

*Primary Examiner* — Jeffrey D Washville
(74) *Attorney, Agent, or Firm* — Leydig, Voit & Mayer, Ltd.

(57) ABSTRACT

Disclosed are an organic binder-based coating; a composite gypsum board containing face and back cover sheets, an outside surface of the back cover sheet bearing the coating; and a method of preparing composite board where the back cover sheet contains the coating on its outer surface. The coating is formed from a composition comprising an alkaline silicate, a solid filler, and optionally, a borate. An enhancing layer can also be applied to the back cover sheet.

18 Claims, 1 Drawing Sheet

(51) Int. Cl.
*C04B 28/14* (2006.01)
*E04C 2/04* (2006.01)
*E04B 1/94* (2006.01)
*C04B 41/45* (2006.01)
*B28B 11/14* (2006.01)
*B28B 11/04* (2006.01)
*B28B 11/24* (2006.01)
*B32B 13/08* (2006.01)
*C04B 18/08* (2006.01)
*C04B 111/00* (2006.01)
*C04B 111/28* (2006.01)

(52) U.S. Cl.
CPC ........ *B28B 11/243* (2013.01); *B28B 19/0092* (2013.01); *B32B 13/08* (2013.01); *C04B 28/14* (2013.01); *C04B 41/4535* (2013.01); *E04B 1/942* (2013.01); *E04C 2/043* (2013.01); *C04B 18/08* (2013.01); *C04B 2111/0062* (2013.01); *C04B 2111/28* (2013.01)

(56) References Cited

U.S. PATENT DOCUMENTS

| | | |
|---|---|---|
| 3,616,173 A | 10/1971 | Green et al. |
| 3,853,571 A | 12/1974 | Gelbman |
| 4,405,682 A | 9/1983 | Fujita et al. |
| 4,994,113 A | 2/1991 | Helmstetter |
| 5,643,510 A | 7/1997 | Sucech |
| 5,683,635 A | 11/1997 | Sucech et al. |
| 6,342,284 B1 | 1/2002 | Yu et al. |
| 6,409,825 B1 | 6/2002 | Yu et al. |
| 6,494,609 B1 | 12/2002 | Wittbold et al. |
| 6,632,550 B1 | 10/2003 | Yu et al. |
| 6,669,919 B1 | 12/2003 | Greinke |
| 6,815,049 B2 | 11/2004 | Veeramasuneni et al. |
| 6,822,033 B2 | 11/2004 | Yu et al. |
| 6,874,930 B2 | 4/2005 | Wittbold et al. |
| 7,364,676 B2 | 4/2008 | Sucech et al. |
| 7,776,170 B2 | 8/2010 | Yu et al. |
| 7,811,685 B2 | 10/2010 | Wang et al. |
| 7,833,638 B2 | 11/2010 | Zheng et al. |
| 8,323,785 B2 | 12/2012 | Yu et al. |
| 8,974,925 B1 | 3/2015 | Cao et al. |
| 10,421,250 B2 | 9/2019 | Li et al. |
| 10,421,251 B2 | 9/2019 | Li et al. |
| 2003/0175478 A1 | 9/2003 | Leclercq |
| 2006/0070321 A1 | 4/2006 | Au |
| 2008/0286609 A1 | 11/2008 | Surace et al. |
| 2008/0308968 A1 | 12/2008 | Immordino, Jr. |
| 2010/0247937 A1 | 9/2010 | Liu et al. |
| 2011/0195241 A1 | 8/2011 | Yu et al. |
| 2012/0168527 A1 | 7/2012 | Li et al. |
| 2012/0170403 A1 | 7/2012 | Li et al. |
| 2012/0207989 A1 | 8/2012 | Xu et al. |
| 2014/0113124 A1 | 4/2014 | Sang et al. |
| 2014/0130435 A1 | 5/2014 | Paradis et al. |
| 2015/0010767 A1 | 1/2015 | Sang et al. |
| 2015/0103861 A1 | 4/2015 | Cao et al. |
| 2015/0104629 A1 | 4/2015 | Cao et al. |
| 2015/0125683 A1 | 5/2015 | Cao et al. |
| 2016/0375656 A1 | 12/2016 | Li et al. |
| 2016/0376191 A1 | 12/2016 | Li et al. |
| 2017/0246838 A1* | 8/2017 | Rohlf ............... B32B 13/08 |
| 2018/0079691 A1* | 3/2018 | Donelan ............ C04B 30/02 |
| 2018/0119417 A1* | 5/2018 | Li ..................... C04B 28/14 |

FOREIGN PATENT DOCUMENTS

| | | |
|---|---|---|
| EP | 2762522 A1 | 8/2014 |
| FR | 862160 A | 2/1941 |
| JP | H10-218688 A | 8/1998 |
| WO | WO 2019/241379 A1 | 12/2019 |

OTHER PUBLICATIONS

Ariyanayagam et al., "Fire tests of non-load bearing light gauge steel frame walls lined with calcium silicate boards and gypsum plasterboards," *Thin-Walled Structures*, 115: 86-99 (2017).

Chen et al., "Fire Resistance Prediction of Load Bearing Cold-Formed Steel Walls Lined with Gypsum Composite Panels," *International Specialty Conference on Cold-Formed Steel Structures 2*, St. Louis, Missouri, USA (Nov. 5 & 6, 2014).

Giannopoulou et al., "Fire Resistant Geopolymers Synthesized from Industrial Wastes," *World Journal of Engineering*, 5(3): 130-131 (2008).

U.S. Appl. No. 17/156,258, filed Jan. 22, 2021.

European Patent Office, International Search Report in International Application No. PCT/US2021/015478 (dated Apr. 23, 2021).

* cited by examiner

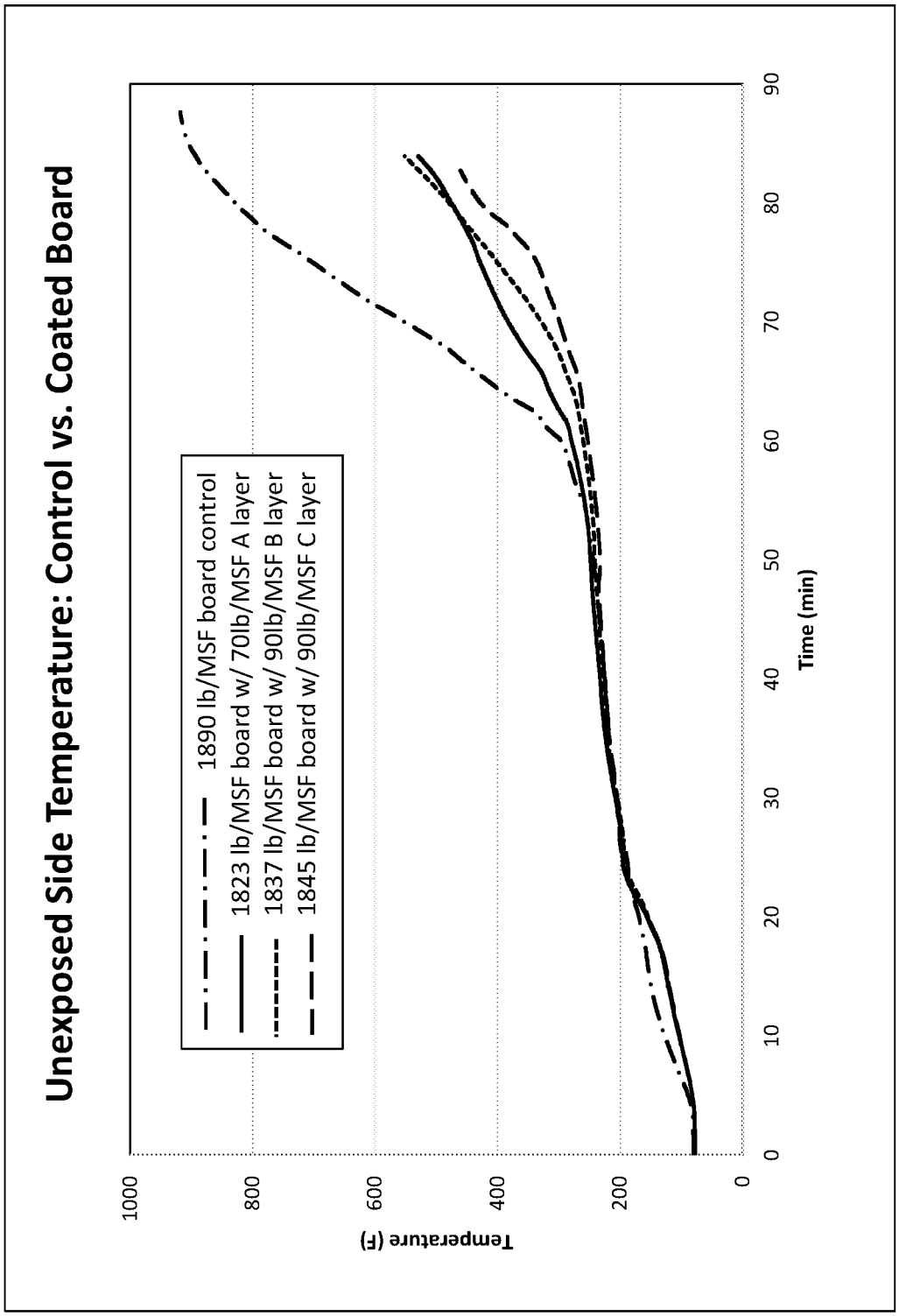

GYPSUM WALLBOARD WITH ENHANCED FIRE RESISTANCE, AND RELATED COATINGS AND METHODS

CROSS-REFERENCE TO RELATED APPLICATION

This patent application claims the benefit of priority to U.S. Provisional Patent Application No. 62/862,493, filed Jun. 17, 2019, which is incorporated by reference in its entirety herein.

BACKGROUND OF THE INVENTION

Products made of gypsum (calcium sulfate dihydrate; $CaSO_4 \cdot 2H_2O$) are generally manufactured by combining stucco, also known as calcined gypsum (calcium sulfate hemihydrate; $CaSO_4 \cdot \frac{1}{2}H_2O$), with water and other ingredients as desired (such as foaming agent and other additives). Gypsum can be naturally found or synthetically developed and then calcined to make the stucco. The stucco, water, and other additives are normally combined in a mixer, at a "wet end" of a manufacturing line. The resulting slurry is set into a desired shape of a product, such as gypsum board (sometimes called "drywall"). It is the rehydration reaction of the slurry with water that forms set gypsum. Board is sometimes referred to as "panels" in the art. Gypsum wallboard normally has a sandwich structure with the core formed from the slurry placed between two cover sheets (e.g., made of paper or other material). A dense layer (sometimes called a "bonding layer") can be placed between the core and the cover sheet on either or both of the top and bottom surfaces of the core to enhance paper/core bond.

Board normally has two cover sheets on either side of the core. A top cover sheet is for the "face" side of the board as that side is normally facing out and can be decorated, e.g., with paint. The bottom cover sheet is for the "back" side of the board as it is normally not visible when mounted as that surface normally faces inward, toward studs or other framing. Board is normally manufactured upside down, with the face side down at the wet end of the manufacturing line, although the board can be flipped later in the process. The slurry is normally formed on a conveyor to form a long, continuous ribbon. The slurry forming the ribbon begins to set on the conveyor as the calcium sulfate hemihydrate (stucco) reacts with water to form calcium sulfate dihydrate (gypsum). The ribbon is cut one or more times, dried in a kiln, and finally processed at the "dry end" of the manufacturing line.

Wallboard containing gypsum is widely used for interior wall and ceiling surfaces. Standard gypsum wallboard has fire resistance properties. Should the finished gypsum panels be exposed to relatively high temperatures, such as those produced by high temperature flames or gases, portions of the gypsum core may absorb sufficient heat to start the release of water from the gypsum dihydrate crystals of the core. The absorption of heat and release of water from the gypsum dihydrate may be sufficient to retard heat transmission through or within the panels for a time. The gypsum panel can act as a barrier to prevent high temperature flames from passing directly through the wall system. The heat absorbed by the gypsum core can be sufficient to essentially recalcine portions of the core, depending on the heat source temperatures and exposure time. At certain temperature levels, the heat applied to a panel also may cause phase changes in the anhydrite of the gypsum core and rearrangement of the crystalline structures. In some instances, the presence of salts and impurities may reduce the melting point of the gypsum core crystal structures.

Some gypsum wallboard products are made even more fire-resistant than standard gypsum wallboard. For example, vermiculite ore (unexpanded vermiculite) is one of the most important additives in the formulation of fire resistant gypsum wallboard, such as ULX and ULIX (ultralight board). Typical commercial products are USG SHEETROCK® brand Firecode C and Firecode X panels.

Some fire-resistant board is considered "fire-rated" when the board passes certain tests while in an assembly of wallboards affixed to studs. The fire-ratings relate to the assembly passing certain tests, including certain tests of Underwriters Laboratories (UL), including UL tests U305, U419, and U423 (sometimes simply called UL 305, UL 419, and UL 423).

BRIEF SUMMARY OF THE INVENTION

The invention provides a composite gypsum board, coating composition, or method of making gypsum board, as described herein. Surprising and unexpectedly, fire resistance in a gypsum wallboard can be enhanced by the use of an inorganic binder-based coating applied on an outer surface of a back cover sheet of the board. Optionally, an enhancing layer can be applied to the back cover sheet (e.g., over the inorganic binder-based coating) to enhance sag resistance.

Thus, in one aspect, the invention provides a gypsum board comprising a gypsum layer disposed between a face and back cover sheet. The gypsum layer comprises a crystalline matrix of set gypsum and a coating disposed on an outer surface of the back cover sheet. The coating is formed from a composition comprising an alkaline silicate, a solid filler, and optionally a borate. The gypsum board meets at least one of the following tests when the board is tested at a thickness of ⅝ (0.625) inch: a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and/or where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes). In some embodiments, the gypsum board meets at least two of these tests. In some embodiments, the gypsum board meets at least three of these tests. In some embodiments, the gypsum board meets at least four of these tests.

In some embodiments, the gypsum board meets all five of these tests. If included, the enhancing layer can include a mild acidic material in aqueous solution and a solid filler additive. In some embodiments, the mild acid material contains, e.g., calcium chloride, aluminum sulfate, phosphoric acid, aluminum chloride, magnesium chloride, acetic acid, or any combination thereof. In some embodiments, the solid filler additive contains, e.g., calcite, calcium carbonate, clay, mica, magnesite, perlite, fly ash, slag, or any combination thereof.

In another aspect, the invention provides a method of making gypsum board. The method comprises mixing at least water, stucco, and optional other ingredients to form a slurry. The slurry is disposed between a face cover sheet and a back cover sheet to form a board precursor. The board precursor is cut into a board. The board is dried. A coating composition is applied on an outer surface of the back cover sheet. The coating composition comprises an alkaline silicate, a solid filler, and optionally a borate. The gypsum board has at least one of the following when the board is tested at a thickness of ⅝ (0.625) inch: a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and/or where, when the board is cast at a nominal thickness of ⅝-inch, an assembly is constructed in accordance with any one of UL Design Numbers U305, U419 or U423, the assembly having a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., about 60 minutes); or an average value of the temperature sensors is less than about 250° F. plus ambient temperature after about 50 minutes (e.g., about 60 minutes). In some embodiments, the gypsum board meets at least two of these tests. In some embodiments, the gypsum board meets at least three of these tests. In some embodiments, the gypsum board meets at least four of these tests. In some embodiments, the gypsum board meets all five of these tests. If included (e.g., as applied over the coating composition), the enhancing layer can include a mild acidic material in aqueous solution and a solid filler additive. In some embodiments, the mild acid material contains, e.g., calcium chloride, aluminum sulfate, phosphoric acid, aluminum chloride, magnesium chloride, acetic acid, or any combination thereof. In some embodiments, the solid filler additive contains, e.g., calcite, calcium carbonate, clay, mica, magnesite, perlite, fly ash, slag, or any combination thereof.

In another aspect, the invention provides a coating composition for application to a cover sheet of a gypsum wallboard. The coating composition comprises an alkaline silicate, a solid filler, and optionally a borate. In some embodiments, the alkaline silicate is, e.g., a sodium silicate, a potassium silicate, a lithium silicate, or any combination thereof. In some embodiments, if present, the borate is sodium metaborate, sodium tetraborate, potassium tetraborate, potassium pentaborate, ammonium pentaborate, borax decahydrate, boric oxide, or any combination thereof.

BRIEF DESCRIPTION OF THE SEVERAL VIEWS OF THE DRAWING(S)

FIG. 1 is a graph of the temperature (Y-axis) from the unexposed side of boards versus time (X-axis) as described in Example 1.

DETAILED DESCRIPTION OF THE INVENTION

Embodiments of the present invention provide a gypsum board that exhibits fire resistance beyond what is found in regular wallboard, as well as related coatings and methods. It will be understood that the term "wallboard" includes the use of such board on wall surfaces as well as on surfaces other than walls, such as ceilings or other desired end-uses. The board includes two cover sheets, one as the face of the board, and the other as the back of the board. An inorganic binder-based coating is preferably applied to the back cover sheet on a surface facing out, e.g., facing studs or the like when in use. Other embodiments of the invention provide an inorganic binder-based coating, and a method of making a board containing the coating.

The resulting board containing the coating desirably passes small-scale fire tests, e.g., a test in accordance with ASTM C1795-15, when the board is tested at a thickness of ⅝ (0.625) inch. For example, in preferred embodiments, the board meets at least one of the following: a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and/or a High Temperature Thickness Expansion in the z direction of at least about 0.1% when thickness is evaluated according to the analogous techniques and methodology of ASTM C1795-15. In addition, in some embodiments, the board can pass one or more tests when in an assembly. For example, in some embodiments, when the board is cast at a nominal thickness of ⅝-inch, an assembly is constructed in accordance with any one of UL Design Numbers U305, U419 or U423, the assembly having a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after about 60 minutes; or an average value of the temperature sensors is less than about 250° F. plus ambient temperature after about 60 minutes. In various embodiments, the board meets at least two, at least three, at least four, or all five of the foregoing tests.

The coating is generally an inorganic binder-based coating comprising a liquid binder and solid fillers. It is formed from a composition comprising an alkaline silicate, a solid filler, and optionally a borate. While not wishing to be bound by any particular theory, it is believed that, surprising and unexpectedly, a low thermal conductivity char layer or air barrier can form between the inorganic coating and the gypsum layer during fire. This layer is believed to act as an insulation layer to desirably enhance fire resistance beyond what is expected from conventional wallboard.

The binder can be an alkaline (e.g., silicate) based solution. Silicates can be any type of alkaline silicates, such as sodium silicates, potassium silicates, lithium silicates, etc., or any combination thereof. They can be either in the form of solid or the form of liquid, such as solid sodium silicates or sodium silicate liquid, also known as waterglass. Any suitable ratio of sodium oxide and silica can be used in order to make sodium silicate solution. For example, in some embodiments, the ratio of sodium oxide to silica can be from about 1:1.5 to about 1:3.5, e.g., from about 1:2.7 to about 1:3.2. The inorganic binder can be included in the composition in any suitable amount, e.g., from about 10% to about 100%, e.g., from about 10% to about 90%, from about 10% to about 70%, or from about 20% to about 70%, based on the total weight of solids in the dry coating composition.

Any suitable solid filler can be used in the inorganic binder-based coating. In some embodiments, the solid filler can be in the form of minerals and mineral-like fillers such as, for example, mica, clay, wollastonite, magnesite, perlite, talc, bentonite, limestone, gypsum, zinc oxide, zinc sulfate, hollow beads, zeolites, fly ash, bottom ash, coal ash, steel slag, iron slag, limestone slag, and any combination thereof. In some embodiments, the solid filler is mica, limestone, clay, wollastonite, magnesite, perlite, fly ash, slag, or any combination thereof. The solid filler can be included in any suitable amount, such as from about 10% to about 90%, e.g., from about 40% to about 60%, based on the total weight of solids in the dry coating composition. In some embodiments, the composition for forming the inorganic binder-based coating is substantially free of calcite. As used herein, "substantially free" can mean either (i) 0 wt. % based on the weight of the composition, or (ii) an ineffective or (iii) an immaterial amount of calcite. An example of an ineffective amount is an amount below the threshold amount to achieve the intended purpose of using such calcite, as one of ordinary skill in the art will appreciate. An immaterial amount may be, e.g., below about 1 wt. %, below about 0.5 wt. %, below about 0.2 wt. %, below about 0.1 wt. %, or below about 0.01 wt. %, as one of ordinary skill in the art will appreciate.

Borate salts optionally can be added. The borate salts can be any type of borates which partially or fully dissolve in water, such as sodium metaborate, sodium tetraborate, potassium tetraborate, potassium pentaborate, ammonium pentaborate, borax decahydrate, boric oxide etc., or any combination thereof. They can be either in the form of solid or the form of liquid. Any suitable ratio of borate and silicate can be used. For example, the ratio of borate to silicate can be from about 1:55 to about 1:1.5, e.g., from about 1:15 to about 1:2.5. The solubility of borate in the silicate solution can be adjusted by increasing solution temperature or adding alkaline chemicals, such as sodium hydroxide, potassium hydroxide, ammonia etc. The borate salts can be included in the composition in any suitable amount, e.g., from about 0.5% to about 10%, e.g., from about 1% to about 5%, based on the total weight of solids in the dry coating composition.

The composition forming the inorganic binder-based coating is aqueous. Water can be included in any suitable amount, such as from about 10% to about 70% by weight of the wet composition, e.g., from about 40% to about 60% by weight of the wet composition.

Preferably, the composition is substantially free of a latex compound such as polyvinyl acetate, styrene butadiene, polyvinyl alcohol, or polyethylene. In addition, it is preferable that the composition is substantially free of a magnesium compound such as magnesium chloride or magnesium oxide. As used herein, "substantially free" can mean either (i) 0 wt. % based on the weight of the composition, or (ii) an ineffective or (iii) an immaterial amount of latex or magnesium compound. An example of an ineffective amount is an amount below the threshold amount to achieve the intended purpose of using such latex or magnesium compound, as one of ordinary skill in the art will appreciate. An immaterial amount may be, e.g., below about 1 wt. %, below about 0.5 wt. %, below about 0.2 wt. %, below about 0.1 wt. %, or below about 0.01 wt. %, as one of ordinary skill in the art will appreciate.

Optionally, an enhancing layer can be used as a second layer on the surface of the inorganic binder coating. The enhancing layer can be used in order to improve sag resistance. The enhancing layer comprises enhancing agents that have mild acidic pH (e.g., a pH of from about 0.2 to about 6.5, such as from about 0.2 to about 6, from about 0.2 to about 5, from about 0.2 to about 4, from about 0.2 to about 3, from about 0.5 to about 6.5, from about 0.5 to about 6, from about 0.5 to about 5, from about 0.5 to about 4 or from about 0.5 to about 3.0), and solid filler additives.

For example, mild acidic materials in aqueous solutions can include calcium chloride, aluminum sulfate, phosphoric acid, aluminum chloride, magnesium chloride, acetate acid, etc., or any combination thereof. The solid filler additives in the enhancing layer can be minerals such as calcite, calcium carbonate, clay, mica, magnesite, perlite, or solid waste such as fly ash, slag, etc., or any combination thereof. The enhancing layer can include either the enhancing agents in an aqueous solution or in a combination of the enhancing agent solution and solid additives.

The inorganic binder coating can be applied to the back cover sheet in any suitable manner. For example, in some embodiments, it can be rolled or sprayed on the back side of dry board. For example, the coating can be introduced directly on the outside surface of back paper during the board production process. It is also possible to make "sandwich back paper" during the board production process, i.e., the inorganic binder layer is added in between two layers of back paper. The "sandwich back paper" then is used as the single layer of the back paper to make gypsum wallboard. The back paper can be either hydrophilic or hydrophobic. If present, the enhancing layer can be applied over the inorganic binder-based coating (before or after allowing the inorganic based coating to dry). If desired, the enhancing layer can be applied first, with the inorganic binder-based coating applied over the enhancing layer (wet or dry). The inorganic binder-based coating and enhancing layer can have any suitable dimensions. For example, in some embodiments, the inorganic binder-based coating can have a thickness of from about 0.02 inch to about 0.125 inch, such as from about 0.03 inch to about 0.0625 inch. In some embodiments, the enhancing layer can have a thickness of from about 0.018 inch to about 0.0625 inch, e.g., from about 0.02 inch to about 0.06 inch.

A gypsum slurry (sometimes called a stucco slurry) is used to prepare one or more gypsum layers in the composite board. Normally, the composite board contains a primary gypsum layer, often referred to as a core, sandwiched between the face and back cover sheets. In some embodiments, a skim coat is disposed between the core and one or both cover sheets. In some embodiments, a concentrated layer (as described in U.S. patent application Ser. Nos. 15/186,176, 15/186,212, 15/186,232, and 15/186,257) is provided between the so-called gypsum core and one or both of the cover sheets. The gypsum slurry includes water and stucco, as well as other optional ingredients as desired.

Any suitable type of stucco can be used in the gypsum slurry, including calcium sulfate alpha hemihydrate, calcium sulfate beta hemihydrate, and calcium sulfate anhydrate. The stucco can be fibrous or non-fibrous. Embodiments of the disclosure can accommodate any suitable water-to-stucco ratio (WSR). In some embodiments, the WSR is from about 0.3 to about 1.5, such as, for example, from about 0.3 to about 1.3, from about 0.3 to about 1.2, from about 0.3 to about 1, from about 0.3 to about 0.8, from about 0.5 to about 1.5, from about 0.5 to about 1.3, from about 0.5 to about 1.2, from about 0.5 to about 1, from about 0.5 to about 0.8, from about 0.7 to about 1.5, from about 0.7 to about 1.3, from about 0.7 to about 1.2, from about 0.7 to about 1, from about 0.8 to about 1.5, from about 0.8 to about 1.3, from about 0.8 to about 1.2, from about 0.8 to about 1, from about 0.9 to about 1.5, from about 0.9 to about 1.3, from about 0.9 to about 1.2, from about 1 to about 1.5, from about 1 to about 1.4, from about 1 to about 1.2, etc.

The gypsum slurry can include accelerators or retarders as known in the art to adjust the rate of setting if desired. Accelerators can be in various forms (e.g., wet gypsum accelerator, heat resistant accelerator, and climate stabilized accelerator). See, e.g., U.S. Pat. Nos. 3,573,947 and 6,409,825. In some embodiments where accelerator and/or retarder are included, the accelerator and/or retarder each can be in the stucco slurry for forming the board core in an amount on a solid basis of, such as, from about 0% to about 10% by weight of the stucco (e.g., about 0.1% to about 10%), such as, for example, from about 0% to about 5% by weight of the stucco (e.g., about 0.1% to about 5%).

Other optional additives can be included in the gypsum slurry to provide desired properties, including green strength, sag resistance, water resistance, mold resistance, fire rating, thermal properties, board strength, etc. Examples of suitable additives include, for example, strength additives such as starch, dispersant, polyphosphate, high expansion particulate, heat sink additive, fibers, siloxane, magnesium oxide, etc., or any combination thereof. The use of the singular term additive herein is used for convenience but will be understood to encompass the plural, i.e., more than one additive in combination, as one of ordinary skill in the art will readily appreciate.

In some embodiments, the gypsum slurry optionally includes a starch that is effective to increase the strength of the gypsum board relative to the strength of the board without the starch (e.g., via increased nail pull resistance). Any suitable strength enhancing starch can be used, including hydroxyalkylated starches such as hydroxyethylated or hydroxypropylated starch, or a combination thereof, or pregelatinized starches, which are generally preferred over acid-modifying migrating starches which generally provide paper-core bond enhancement but not core strength enhancement. Any suitable pregelatinized starch can be included in the enhancing additive, as described in U.S. Patent Publications 2014/0113124 A1 and 2015/0010767 A1, including methods of preparation thereof and desired viscosity ranges described therein.

If included, the pregelatinized starch can exhibit any suitable viscosity. In some embodiments, the pregelatinized starch is a mid-range viscosity starch as measured according to the VMA method as known in the art and as set forth in U.S. Patent Publication 2014/0113124 A1, which VMA method is hereby incorporated by reference. Desirable pregelatinized starches in accordance with some embodiments can have a mid-range viscosity, e.g., according to the VMA method when measured in a 15 wt. % solution of starch in water, of from about 20 centipoise to about 700 centipoise, e.g., from about from about 20 centipoise to about 600 centipoise, from about 20 centipoise to about 500 centipoise, from about 20 centipoise to about 400 centipoise, from about 20 centipoise to about 300 centipoise, from about 20 centipoise to about 200 centipoise, from about 20 centipoise to about 100 centipoise, from about 30 centipoise to about 700 centipoise, from about 30 centipoise to about 600 centipoise, from about 30 centipoise to about 500 centipoise, from about 30 centipoise to about 400 centipoise, from about 30 centipoise to about 300 centipoise, from about 30 centipoise to about 200 centipoise, from about 30 centipoise to about 100 centipoise, from about 50 centipoise to about 700 centipoise, from about 50 centipoise to about 600 centipoise, from about 50 centipoise to about 500 centipoise, from about 50 centipoise to about 400 centipoise, from about 50 centipoise to about 300 centipoise, from about 50 centipoise to about 200 centipoise, from about 50 centipoise to about 100 centipoise, from about 70 centipoise to about 700 centipoise, from about 70 centipoise to about 600 centipoise, from about 70 centipoise to about 500 centipoise, from about 70 centipoise to about 400 centipoise, from about 70 centipoise to about 300 centipoise, from about 70 centipoise to about 200 centipoise, from about 70 centipoise to about 100 centipoise, from about 100 centipoise to about 700 centipoise, from about 100 centipoise to about 600 centipoise, from about 100 centipoise to about 500 centipoise, from about 100 centipoise to about 400 centipoise, from about 100 centipoise to about 300 centipoise, from about 100 centipoise to about 200 centipoise, etc. In accordance with some embodiments, the pregelatinized starch can be prepared as an extruded starch, e.g., where starch is prepared by pregelatinization and acid-modification in one step in an extruder as described in U.S. Patent Publication 2015/0010767 A1, which extrusion method is hereby incorporated by reference.

If included, the starch can be present in any suitable amount. In some embodiments, the starch is present in the gypsum slurry in an amount of from about 0% to about 20% by weight of the stucco, e.g., from about 0% to about 15% by weight of stucco, from about 0% to about 10% by weight of stucco, from about 0.1% to about 20% by weight of stucco, from about 0.1% to about 15% by weight of stucco, from about 0.1% to about 10% by weight of stucco, from about 0.1% to about 6% by weight of stucco, from about 0.3% to about 4% by weight of stucco, from about 0.5% to about 4% by weight of stucco, from about 0.5% to about 3% by weight of stucco, from about 0.5% to about 2% by weight of stucco, from about 1% to about 4% by weight of stucco, from about 1% to about 3% by weight of stucco, from about 1% to about 2% by weight of stucco, etc.

The gypsum slurry can optionally include at least one dispersant to enhance fluidity in some embodiments. The dispersants may be included in a dry form with other dry ingredients and/or in a liquid form with other liquid ingredients in stucco slurry. Examples of dispersants include naphthalenesulfonates, such as polynaphthalenesulfonic acid and its salts (polynaphthalenesulfonates) and derivatives, which are condensation products of naphthalenesulfonic acids and formaldehyde; as well as polycarboxylate dispersants, such as polycarboxylic ethers, for example, PCE211, PCE111, 1641, 1641F, or PCE 2641-Type Dispersants, e.g., MELFLUX 2641F, MELFLUX 2651F, MELFLUX 1641F, MELFLUX 2500L dispersants (BASF), and COATEX Ethacryl M, available from Coatex, Inc.; and/or lignosulfonates or sulfonated lignin. Naphthalenesulfonate dispersants can be used to facilitate formation of larger bubbles and hence larger voids in the final product, and polycarboxylates such as polycarboxylate ethers can be used to form smaller bubbles and hence smaller voids in the product. As void structure changes to the product are desired during manufacture, such dispersant adjustments and other changes in the process can be made as one of ordinary skill will appreciate. Lignosulfonates are water-soluble anionic polyelectrolyte polymers, byproducts from the production of wood pulp using sulfite pulping. One example of a lignin useful in the practice of principles of embodiments of the present disclosure is Marasperse C-21 available from Reed Lignin Inc.

Lower molecular weight dispersants are generally preferred. Lower molecular weight naphthalenesulfonate dispersants are favored because they trend to a lower water demand than the higher viscosity, higher molecular weight dispersants. Thus, molecular weights from about 3,000 to about 10,000 (e.g., about 8,000 to about 10,000) are preferred. As another illustration, for PCE211 type dispersants, in some embodiments, the molecular weight can be from about 20,000 to about 60,000, which exhibit less retardation than dispersants having molecular weight above 60,000.

One example of a naphthalenesulfonate is DILOFLO, available from GEO Specialty Chemicals. DILOFLO is a 45% naphthalenesulfonate solution in water, although other aqueous solutions, for example, in the range of about 35% to about 55% by weight solids content, are also readily available. Naphthalenesulfonates can be used in dry solid or powder form, such as LOMAR D, available from GEO Specialty Chemicals, for example. Another example of naphthalenesulfonate is DAXAD, available from GEO Specialty Chemicals.

If included, the dispersant can be provided in any suitable amount. In some embodiments, for example, the dispersant is present in an amount, for example, from about 0% to about 0.7% by weight of stucco, 0% to about 0.4% by weight of stucco, from about 0.05% to about 5% by weight of the stucco, from about 0.05% to about 0.3% by weight of stucco, or from about 1% to about 5% by weight of stucco.

In some embodiments, the gypsum slurry can optionally include one or more phosphate-containing compounds, if desired. For example, phosphate-containing components useful in some embodiments include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salt. See, e.g., U.S. Pat. Nos. 6,342,284; 6,632,550; 6,815,049; and 6,822,033.

Phosphate compositions if added in some embodiments can enhance green strength, resistance to permanent deformation (e.g., sag), dimensional stability, etc. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is preferred, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1,000-3,000 repeating phosphate units and having the molecular formula $(NH_4)_{n+2}PnO_{3n+1}$ wherein n=1,000-3,000, or polyphosphoric acid having two or more repeating phosphoric acid units and having the molecular formula $H_{n+2}P_nO_{3n+1}$ wherein n is two or more.

If included, the phosphate-containing compound can be present in any suitable amount. To illustrate, in some embodiments, the phosphate-containing compound can be present in an amount, for example, from about 0.01% to about 1%, e.g., from about 0.1% to about 1%, or from about 0.2% to about 0.4% by weight of the stucco.

A water resistance or mold resistance additive such as siloxane optionally can be included. If included, in some embodiments, the siloxane preferably is added in the form of an emulsion. The slurry is then shaped and dried under conditions which promote the polymerization of the siloxane to form a highly cross-linked silicone resin. A catalyst which promotes the polymerization of the siloxane to form a highly cross-linked silicone resin can be added to the gypsum slurry. As described in U.S. Pat. No. 7,811,685, magnesium oxide can be included to contribute to the catalysis and/or to the mold resistance and/or water resistance in some embodiments. If included, magnesium oxide, is present in any suitable amount, such as from about 0.02% to about 1.0%, e.g., from about 0.02% to about 0.04% by weight of stucco.

In some embodiments, solventless methyl hydrogen siloxane fluid sold under the name SILRES BS 94 by Wacker-Chemie GmbH (Munich, Germany) can be used as the siloxane. This product is a siloxane fluid containing no water or solvents. It is contemplated that from about 0.05% to about 1.5%, e.g., from about 0.07% to about 0.14%, of the BS 94 siloxane may be used in some embodiments, based on the weight of the stucco. For example, in some embodiments, it is preferred to use from about 0.05% to about 0.5%, e.g., from about 0.09% to about 0.12% of the siloxane based on the dry stucco weight.

Any suitable foaming agent composition useful for generating foam in gypsum slurries can be utilized. Suitable foaming agents are selected to result in air voids in the final product such that the weight of the board core can be reduced. In some embodiments, the foaming agent comprises a stable soap, an unstable soap, or a combination of stable and unstable soaps. In some embodiments, one component of the foaming agent is a stable soap, and the other component is a combination of a stable soap and unstable soap. In some embodiments, the foaming agent comprises an alkyl sulfate surfactant.

Many commercially known foaming agents are available and can be used in accordance with embodiments of the disclosure, such as the HYONIC line (e.g., 25AS) of soap products from GEO Specialty Chemicals, Ambler, Pa. Other commercially available soaps include the Polystep B25, from Stepan Company, Northfield, Ill. The foaming agents described herein can be used alone or in combination with other foaming agents.

Some types of unstable soaps, in accordance with embodiments of the disclosure, are alkyl sulfate surfactants with varying chain length and varying cations. Suitable chain lengths, can be, for example, $C_8$-$C_{12}$, e.g., $C_8$-$C_{10}$, or $C_{10}$-$C_{12}$. Suitable cations include, for example, sodium, ammonium, magnesium, or potassium. Examples of unstable soaps include, for example, sodium dodecyl sulfate, magnesium dodecyl sulfate, sodium decyl sulfate, ammonium dodecyl sulfate, potassium dodecyl sulfate, potassium decyl sulfate, sodium octyl sulfate, magnesium decyl sulfate, ammonium decyl sulfate, blends thereof, and any combination thereof.

Some types of stable soaps, in accordance with embodiments of the disclosure, are alkoxylated (e.g., ethoxylated) alkyl sulfate surfactants with varying (generally longer) chain length and varying cations. Suitable chain lengths, can be, for example, $C_{10}$-$C_{14}$, e.g., $C_{12}$-$C_{14}$, or $C_{10}$-$C_{12}$. Suitable cations include, for example, sodium, ammonium, magnesium, or potassium. Examples of stable soaps include, for example, sodium laureth sulfate, potassium laureth sulfate, magnesium laureth sulfate, ammonium laureth sulfate, blends thereof, and any combination thereof. In some embodiments, any combination of stable and unstable soaps from these lists can be used.

Examples of combinations of foaming agents and their addition in preparation of foamed gypsum products are disclosed in U.S. Pat. No. 5,643,510, herein incorporated by reference. For example, a first foaming agent which forms a stable foam and a second foaming agent which forms an unstable foam can be combined. In some embodiments, the first foaming agent is a soap with an alkyl chain length of 8-12 carbon atoms and an alkoxy (e.g., ethoxy) group chain length of 1-4 units. The second foaming agent is optionally an unalkoxylated (e.g., unethoxylated) soap with an alkyl chain length of 6-20 carbon atoms, e.g., 6-18 carbon atoms or 6-16 carbon atoms. Regulating the respective amounts of these two soaps allows for control of the board foam structure until about 100% stable soap or about 100% unstable soap is reached.

In some embodiments, the foaming agent is in the form of an alkyl sulfate and/or alkyl ether sulfate. Such foaming agents are preferred over olefins such as olefin sulfates because the olefins contain double bonds, generally at the front of the molecule thereby making them undesirably more reactive, even when made to be a soap. Thus, preferably, the foaming agent comprises alkyl sulfate and/or alkyl ether sulfate but is essentially free of an olefin (e.g., olefin sulfate) and/or alkyne. Essentially free of olefin or alkyne means that the foaming agent contains either (i) 0 wt. % based on the weight of stucco, or no olefin and/or alkyne, or (ii) an ineffective or (iii) an immaterial amount of olefin and/or alkyne. An example of an ineffective amount is an amount below the threshold amount to achieve the intended purpose of using olefin and/or alkyne foaming agent, as one of ordinary skill in the art will appreciate. An immaterial amount may be, e.g., below about 0.001 wt. %, such as below about 0.005 wt. %, below about 0.001 wt. %, below about 0.0001 wt. %, etc., based on the weight of stucco, as one of ordinary skill in the art will appreciate.

The foaming agent is included in the gypsum slurry in any suitable amount. For example, in some embodiments, it is included in an amount of from about 0.01% to about 0.25% by weight of the stucco, e.g., from about 0.01% to about 0.1% by weight of the stucco, from about 0.01% to about 0.03% by weight of the stucco, or from about 0.07% to about 0.1% by weight of the stucco.

In some embodiments, additional fire resistant additives optionally can be included in the gypsum slurry for forming the board. For example, the additional fire resistant additives can include fiber, e.g., glass fiber, carbon fiber, or mineral fiber; alumina trihydrate (ATH); and the like. Fiber can be beneficial because it helps to improve board integrity. ATH can provide flame retardance and is further beneficial because its heat absorption capacity is higher than that of gypsum. If included, these additives can be present in the gypsum slurry in an amount of from about 0% to about 20% by weight of the stucco, e.g., from about 0% to about 15% by weight of stucco, from about 0% to about 10% by weight of stucco, from about 1% to about 8% by weight of stucco, etc.

Surprisingly and unexpectedly, embodiments of the invention provide for fire resistance through the use of the inorganic based binder coating without the need for additional fire resistance additives in the slurry for making the gypsum layers, e.g., high expansion particles, vermiculite, expandable graphite, etc. If desired, however, in some embodiments, fire resistance additives can be added to the slurry for making the gypsum layer. For example, in some embodiments, expandable vermiculite optionally is included in the gypsum slurry to further enhance the fire resistance imparted by the inorganic binder-based coating. Expandable vermiculite (sometimes referred to as unexpanded vermiculite) is described in, e.g., U.S. Pat. No. 8,323,785, which discussion is incorporated by reference herein. Any suitable type of expandable vermiculite can be included. Expandable vermiculite in some embodiments is a high expansion vermiculite. High expansion vermiculite particles have a volume expansion after heating for one hour at about 1560° F. (about 850° C.) of about 300% or more of their original volume. One such high expansion vermiculite is often referred to as Grade No. 4 unexpanded vermiculite (U.S. grading system). In some embodiments, at least about 50% of the particles in the high expansion vermiculite used in gypsum board formed according to principles of the present disclosure will be larger than about 50 mesh (i.e., greater than about 0.0117 inch (0.297 mm) openings). In other embodiments, at least about 70% of the particles will be larger than about 70 mesh (i.e., larger than about 0.0083 inch (0.210 mm) openings).

Other particulates with properties comparable to high expansion vermiculite may be optionally included in the gypsum slurry. In some embodiments, high expansion vermiculites can be used that have a volume expansion of about 300% to about 380% of their original volume after being placed for one hour in a chamber having a temperature of about 1560° F. (about 850° C.).

In some embodiments, high expansion vermiculites can be used that are classified under different and/or foreign grading systems. Such high expansion vermiculites should have substantially similar expansion and/or thermal resistance characteristics typical of those discussed herein. For example, in some embodiments, a vermiculite classified as European, South American, or South African Grade 0 (micron) or Grade 1 (superfine) can be used to assist imparting fire resistance to the gypsum board.

If desired, in some embodiments, a Grade No. 5 unexpanded vermiculite can be included in the gypsum slurry. The No. 5 unexpanded vermiculite typically has a volume expansion at about 1560° F. (about 850° C.) of about 225%. In some embodiments, the vermiculite is in the form of a mixture of Grade Nos. 3/4/5 unexpanded vermiculite, which typically has a volume expansion at about 1560° F. (about 850° C.) of about 380%. The blend can include, for example, from about 25 wt. % to about 35 wt. % Grade No. 3, from about 30 wt. % to about 45 wt. % Grade No. 4, and from about 20 wt. % to about 40% wt. % Grade No. 5. To illustrate, in one embodiment, a mixture of Grade Nos. 3/4/5 unexpanded vermiculite can contain, e.g., a weight ratio of 33.3 wt. % Grade 3, 33.3 wt. % Grade 4, and 33.3 wt. % Grade 5.

If included, the vermiculite can be included in any suitable amount. Thus, in preferred embodiments, the expandable vermiculite or other high expansion particles generally is optionally present in an amount less than about 20% by weight of the stucco, e.g., from about 0% to about 20%, from about 0% to about 15%, from about 0% to about 10%, from about 1% to about 15%, from about 2% to about 15%, from about 2% to about 12%, from about 2% to about 10%, from about 2% to about 8%, from about 3% to about 9%, from about 3% to about 8%, from about 4% to about 10%, from about 6% to about 15%, from about 0.1% to about 6%, from about 0.1% to about 5%, from about 0.1% to about 4%, from about 0.1% to about 3%, from about 0.1% to about 2%, from about 0.1% to about 1%, from about 0.1% to about 0.5%, etc. Within these ranges, in various embodiments, the amount of different grades of unexpanded vermiculite may vary in view of their differing expansion capacities.

For example, in the case of grade 4 vermiculite of some embodiments, the expandable vermiculite can be present in an amount less than about 15% by weight of the stucco, e.g., from about 0% to about 3%, from about 2% to about 5%, from about 2% to about 7%, from about 3% to about 8%, from about 3% to about 10%, from about 5% to about 12%, from about 2% to about 15%, from about 7% to about 15%, etc. In the case of grade 5 vermiculite of some embodiments, expandable vermiculite can be present in an amount less than about 20% by weight of the stucco, e.g., from about 0% to about 4%, from about 1% to about 6%, from about 4% to about 8%, from about 4% to about 10%, from about 4% to about 12%, from about 6% to about 15%, from about 2% to about 20%, from about 6% to about 20%, from about 10% to about 20%, etc. In the case of blends of grades 3/4/5 vermiculite of some embodiments, expandable vermiculite can be present in an amount less than about 12% by weight of the stucco, e.g., from about 0% to about 4%, from about 2% to about 4%, from about 3% to about 6%, from about 3% to about 8%, from about 5% to about 8%, from about 5% to about 10%, from about 2% to about 12%, from about 5% to about 12%, from about 8% to about 12%, etc.

In some embodiments, expandable graphite is optionally included in the gypsum slurry to further enhance the fire resistance imparted by the inorganic binder-based coating. Expandable graphite is a form of carbon, and generally contains multiple layers of carbon. Surprisingly and unexpectedly, expandable graphite provides a significant benefit in fire resistant board as the expandable graphite expands considerably upon heating. In this regard, while expandable graphite is stable at room temperatures, the expandable graphite expands. This expansion is beneficial because it can compensate for the shrinkage of the board, e.g., because the gypsum shrinks as the dihydrate molecules associated with the calcium sulfate in the gypsum molecules become dehydrated as the gypsum is calcinated upon exposure to heat. The shrinkage is undesirable because cracks in the board will form, thereby allowing fire to travel through the board.

In some embodiments, the expandable graphite exhibits a volume expansion of at least about two times of its original volume after being heated for one hour at about 1110° F. (600° C.). For example, in some embodiments, the expandable graphite expands by a factor of at least about 10 times its original volume, e.g., from about two times to about 1000 times, such as from about two times to about 750 times, from about two times to about 500 times, from about two times to about 250 times, from about two times to about 100 times, from about two times to about 50 times, from about 10 times to about 1000 times, from about 20 times to about 700 times, from about 30 times to about 500 times, from about 40 times to about 300 times, from about 50 times to about 200 times, etc.

The expandable graphite can have any suitable expansion onset temperature. For example, in some embodiments, the expandable graphite has an onset temperature of from about 250° F. (120° C.) to about 750° F. (400° C.), e.g., from about 250° F. (120° C.) to about 660° F. (350° C.), from about 300° F. (150° C.) to about 450° F. (300° C.), from about 300° F. (150° C.) to about 540° F. (280° C.), from about 320° F. (160° C.) to about 480° F. (250° C.), or from about 360° F. (180° C.) to about 480° F. (250° C.), etc.

The expandable graphite can have any suitable particle size. For example, in some embodiments, the expandable graphite has an average particle size of from about 5 mesh to about 400 mesh, e.g., from about 5 mesh to about 270 mesh, from about 20 mesh to about 200 mesh, from about 20 mesh to about 140 mesh, from about 35 mesh to about 100 mesh, or from about 50 mesh to about 80 mesh, about 40 mesh to about 60 mesh, about 45 mesh to about 55 mesh, etc. In some embodiments, the mean particle size is about 50 mesh. The mesh size can be determined, for example, by sieves and particle size analyzer. Preferably, a desired pH range for the expanded graphite particles is from about 4.0 to about 8.5. In some embodiments, the expandable graphite has a substantially neutral surface chemistry, e.g., from about 5.5 to about 8.5, from about 6 to about 8, from about 6.5 to about 7.5, from about 6.7 to about 7.3 (e.g., about 7), etc.

The expandable graphite can have any suitable density. For example, in some embodiments, the expandable graphite has a density of from about 20 pcf to about 120 pcf, e.g., from about 20 pcf to about 100 pcf, from about 20 pcf to about 90 pcf, from about 20 pcf to about 85 pcf, from about 20 pcf to about 70 pcf, from about 20 pcf to about 45 pcf, from about 30 pcf to about 120 pcf, from about 30 pcf to about 100 pcf, from about 30 pcf to about 90 pcf, from about 30 pcf to about 85 pcf, from about 30 pcf to about 70 pcf, from about 30 pcf to about 45 pcf, from about 50 pcf to about 75 pcf, from about 50 to about 65 pcf, etc.

Examples of commercially available expandable graphite products include GRAFGUARD 160-50 N, having an onset temperature of 320° F. (160° C.), a mesh size of 50, and a neutral surface chemistry; as well as GRAFGUARD 220-50 N, having an onset temperature of 430° F. (220° C.), a mesh size of 50, and a neutral surface chemistry; GRAFGUARD 220-80 N, having an onset temperature of 430° F. (220° C.), a mesh size of 80, and a neutral surface chemistry; GRAFGUARD 250-50 N, having an onset temperature of 480° F. (250° C.), a mesh size of 50, and a neutral surface chemistry. The GRAFGUARD products are commercially available from GrafTech International, Independence, Ohio.

The cover sheets can be in any suitable form. It will be understood that, with respect to cover sheets, the terms "face" and "top" sheets are used interchangeably herein, while the terms "back" and "bottom" are likewise used interchangeably herein. For example, the cover sheets may comprise cellulosic fibers, glass fibers, ceramic fibers, mineral wool, or a combination of the aforementioned materials. One or both of the sheets may comprise individual sheets or multiple sheets. In preferred embodiments, the cover sheets comprise a cellulosic fiber. For example, paper sheet, such as Manila paper or kraft paper, can be used as the back sheet. Useful cover sheet paper includes Manila 7-ply and NewsLine 3-ply, 5-ply, or 7-ply available from United States Gypsum Corporation, Chicago, Ill.; Grey-Back 3-ply and Manila Ivory 3-ply, available from International Paper, Newport, Ind.; and Manila heavy paper and MH Manila HT (high tensile) paper, available from United States Gypsum Corporation, Chicago, Ill.

In some embodiments, one or both sheets can comprise glass fibers, ceramic fibers, mineral wool, or a combination of the aforementioned materials. In other embodiments, the cover sheet can be "substantially free" of glass fibers ceramic fibers, mineral wool, or a mixture thereof, which means that the cover sheets contain either (i) 0 wt. % based on the weight of the sheet, or no such glass fibers ceramic fibers, mineral wool, or a mixture thereof, or (ii) an ineffective or (iii) an immaterial amount of glass fibers ceramic fibers, mineral wool, or a mixture thereof. An example of an ineffective amount is an amount below the threshold amount to achieve the intended purpose of using glass fibers ceramic fibers, mineral wool, or a mixture thereof, as one of ordinary skill in the art will appreciate. An immaterial amount may be, e.g., below about 5 wt. %, such as below about 2 wt. %, below about 1 wt. %, below about 0.5 wt. %, below about 0.2 wt. %, below about 0.1 wt. %, or below about 0.01 wt. % based on the weight stucco as one of ordinary skill in the art will appreciate. However, if desired in alternative embodiments, such ingredients can be included in the cover sheets.

In some embodiments, the thermal conductivity of the top and/or bottom sheet is less than about 0.1 w/(m·k.). For example, the thermal conductivity of the top and/or bottom sheet is less than about 0.05 w/(m·k.).

The cover sheets can also have any suitable total thickness. In some embodiments, at least one of the cover sheets has a relatively high thickness, e.g., a thickness of at least about 0.014 inches. In some embodiments, it is preferred that there is an even higher thickness, e.g., at least about 0.015 inches, at least about 0.016 inches, at least about 0.017 inches, at least about 0.018 inches, at least about 0.019 inches, at least about 0.020 inches, at least about 0.021 inches, at least about 0.022 inches, or at least about 0.023 inches. Any suitable upper limit for these ranges can be adopted, e.g., an upper end of the range of about 0.030 inches, about 0.027 inches, about 0.025 inches, about 0.024 inches, about 0.023 inches, about 0.022 inches, about 0.021 inches, about 0.020 inches, about 0.019 inches, about 0.018 inches, etc. The total sheet thickness refers to the sum of the thickness of each sheet attached to the gypsum board.

The cover sheets can have any suitable density. For example, in some embodiments, at least one or both of the cover sheets has a density of at least about 36 pcf, e.g., from about 36 pcf to about 46 pcf, such as from about 36 pcf to about 44 pcf, from about 36 pcf to about 42 pcf, from about 36 pcf to about 40 pcf, from about 38 pcf to about 46 pcf, from about 38 pcf to about 44 pcf, from about 38 pcf to about 42 pcf, etc.

The cover sheet can have any suitable weight. For example, in some embodiments, lower basis weight cover sheets (e.g., formed from paper) such as, for example, at least about 33 lbs/MSF (e.g., from about 33 lbs/MSF to about 65 lbs/MSF, from about 33 lbs/MSF to about 60 lbs/MSF, 33 lbs/MSF to about 58 lbs/MSF from about 33 lbs/MSF to about 55 lbs/MSF, from about 33 lbs/MSF to about 50 lbs/MSF, from about 33 lbs/MSF to about 45 lbs/MSF, etc., or less than about 45 lbs/MSF) can be utilized in some embodiments. In other embodiments, one or both cover sheets has a basis weight from about 38 lbs/MSF to about 65 lbs/MSF, from about 38 lbs/MSF to about 60 lbs/MSF, from about 38 lbs/MSF to about 58 lbs/MSF, from about 38 lbs/MSF to about 55 lbs/MSF, from about 38 lbs/MSF to about 50 lbs/MSF, from about 38 lbs/MSF to about 45 lbs/MSF, etc.

However, if desired, in some embodiments, even heavier basis weights can be used, e.g., to further enhance nail pull resistance or to enhance handling, e.g., to facilitate desirable "feel" characteristics for end-users. Thus, one or both of the cover sheets can have a basis weight of, for example, at least about 45 lbs/MSF (e.g., from about 45 lbs/MSF to about 65 lbs/MSF, from about 45 lbs/MSF to about 60 lbs/MSF, from about 45 lbs/MSF to about 55 lbs/MSF, from about 50 lbs/MSF to about 65 lbs/MSF, from about 50 lbs/MSF to about 60 lbs/MSF, etc.). If desired, in some embodiments, one cover sheet (e.g., the "face" paper side when installed) can have the aforementioned higher basis weight, e.g., to enhance nail pull resistance and handling, while the other cover sheet (e.g., the "back" sheet when the board is installed) can have somewhat lower weight basis if desired (e.g., weight basis of less than about 60 lbs/MSF, e.g., from about 33 lbs/MSF to about 55 lbs/MSF, from about 33 lbs/MSF to about 50 lbs/MSF, from about 33 lbs/MSF to about 45 lbs/MSF, from about 33 lbs/MSF to about 40 lbs/MSF, etc.).

Board weight is a function of the thickness of the board. Since boards are commonly made at varying thicknesses, board density is used herein as a measure of board weight. Examples of suitable nominal thickness include about ¼ inch, about ⅜ inch, about ½ inch, about ⅝ inch, about ¾ inch, or about one inch, and any range using any of the foregoing as endpoints. In some markets, the board can be formed at a nominal thickness according to metric measurements, e.g., about 9 mm, about 9.5 mm, about 10 mm, about 12 mm, about 12.5 mm, about 13 mm, about 15 mm, about 25 mm, and any range using any of the foregoing as endpoints. Properties referenced herein can be seen in board formed at one or more of the previously mentioned board thicknesses according to various embodiments. The advantages of the gypsum board in accordance with embodiments of the disclosure can be seen at a range of densities, including up to heavier board densities, e.g., about 43 pcf or less, or 40 pcf or less, such as from about 17 pcf to about 43 pcf, from about 20 pcf to about 43 pcf, from about 24 pcf to about 43 pcf, from about 27 pcf to about 43 pcf, from about 20 pcf to about 40 pcf, from about 24 pcf to about 40 pcf, from about 27 pcf to about 40 pcf, from about 20 pcf to about 37 pcf, from about 24 pcf to about 37 pcf, from about 27 pcf to about 37 pcf, from about 20 pcf to about 35 pcf, from about 24 pcf to about 35 pcf, from about 27 pcf to about 35 pcf, etc.

Product according to embodiments of the disclosure can be made on typical manufacturing lines. For example, board manufacturing techniques are described in, for example, U.S. Pat. No. 7,364,676 and U.S. Patent Application Publication 2010/0247937. Briefly, in the case of gypsum board, the process typically involves discharging a cover sheet onto a moving conveyor. Since gypsum board is normally formed "face down," this cover sheet is the "face" cover sheet in such embodiments.

Dry and/or wet components of the gypsum slurry are fed to a mixer (e.g., pin mixer or pin-less mixer), where they are agitated to form the gypsum slurry. The mixer comprises a main body and a discharge conduit (e.g., a gate-canister-boot arrangement as known in the art, or an arrangement as described in U.S. Pat. Nos. 6,494,609 and 6,874,930). In some embodiments, the discharge conduit can include a slurry distributor with either a single feed inlet or multiple feed inlets, such as those described in U.S. Patent Application Publication 2012/0168527 A1 (application Ser. No. 13/341,016) and U.S. Patent Application Publication 2012/0170403 A1 (application Ser. No. 13/341,209), for example. In those embodiments, using a slurry distributor with multiple feed inlets, the discharge conduit can include a suitable flow splitter, such as those described in U.S. Patent Application Publication 2012/0170403 A1. Foaming agent can be added in the discharge conduit of the mixer (e.g., in the gate as described, for example, in U.S. Pat. Nos. 5,683,635 and 6,494,609) or in the main body if desired. Slurry discharged from the discharge conduit after all ingredients have been added, including foaming agent, is the primary gypsum slurry and will form the board core. This board core slurry is discharged onto the moving face cover sheet.

The face cover sheet may bear a thin skim coat on its inner surface in the form of a relatively dense layer of gypsum slurry. Also, hard edges, as known in the art, can be formed, e.g., from the same slurry stream forming the face skim coat. In embodiments where foam is inserted into the discharge conduit, a stream of secondary gypsum slurry can be removed from the mixer body to form the dense skim coat slurry, which can then be used to form the face skim coat and hard edges as known in the art. If included, normally the face skim coat and hard edges are deposited onto the moving face cover sheet before the core slurry is deposited, usually upstream of the mixer. After being discharged from the discharge conduit, the core slurry is spread, as necessary, over the face cover sheet (optionally bearing skim coat) and covered with a second cover sheet (typically the "back" cover sheet) to form a wet assembly in the form of a sandwich structure that is a board precursor to the final product. The second cover sheet may optionally bear a second skim coat on its inner surface, which can be formed from the same or different secondary (dense) gypsum slurry as for the face skim coat, if present. The cover sheets may be formed from paper, fibrous mat or other type of material (e.g., foil, plastic, glass mat, non-woven material such as blend of cellulosic and inorganic filler, etc.).

The wet assembly thereby provided is conveyed to a forming station where the product is sized to a desired thickness (e.g., via forming plate), and to one or more knife sections where it is cut to a desired length. The wet assembly is allowed to harden to form the interlocking crystalline matrix of set gypsum, and excess water is removed using a drying process (e.g., by transporting the assembly through a kiln).

It also is common in the manufacture of gypsum board to use vibration in order to eliminate large voids or air pockets from the deposited slurry. Each of the above steps, as well as processes and equipment for performing such steps, are known in the art.

In some embodiments, the gypsum board can be formed to have the gypsum layer in the form of a concentrated layer on one or both sides of a core layer in a bonding relation, as described in commonly-assigned U.S. application Ser. Nos. 15/186,176; 15/186,212; 15/186,232; and Ser. No. 15/186,257, which are incorporated by reference.

In some embodiments, the gypsum board can pass certain tests using a small scale bench test when the board is tested at a thickness of ⅝ (0.625) inch, in accordance with ASTM C1795-15, including high temperature shrinkage in the x-y directions (width-length), high temperature shrinkage (or even expansion) in the z-direction (thickness), and a Thermal Insulation Index (TI). Such bench tests are suitable for predicting the fire resistance performance of the gypsum board, e.g., in full scale tests under ASTM E119-09a for assemblies constructed under any of UL U305, U419, and/or U423 (2015 editions), and/or equivalent fire test procedures and standards. Passing the ASTM E119-09a test with the assembly of any one of these UL tests allows for a fire-rating. Briefly, UL U305 calls for wood studs in the assembly. UL U419 is a non-load bearing metal stud assembly, using 25 gauge studs. UL U423 is a load bearing metal stud assembly using 20 gauge studs. UL U419 is generally considered a more difficult test to pass than UL U305 or UL U423 because it uses light gauge steel studs that deform more easily than the studs used under UL U305 and UL U423.

In accordance with some embodiments, gypsum board is configured (e.g., as reduced weight and density, ⅝ inch thick gypsum panels) to meet or exceed a "one hour" fire rating pursuant to the fire containment and structural integrity requirements of assemblies constructed under one or more of UL U305, U419, and/or U423, using ASTM E119 and/or equivalent fire test procedures and standards. The present disclosure thus provides gypsum board (e.g., of reduced weight and density), and methods for making the same, that are capable of satisfying at least ¾ hour fire rating pursuant to the fire containment and structural integrity procedures and standards U419.

The gypsum board can be tested, e.g., in an assembly according to Underwriters Laboratories UL U305, U419, and U423 specifications and any other fire test procedure that is equivalent to any one of those fire test procedures. It should be understood that reference made herein to a particular fire test procedure of ASTM E-119 and using assemblies prepared in accordance with Underwriters Laboratories, such as, UL U305, U419, and U423, for example, also includes a fire test procedure, such as one promulgated by any other entity, that is equivalent to ASTM E119-09a and the particular UL standard in question.

Gypsum board according to some embodiments of the present disclosure is effective to withstand the hose stream test also conducted as part of the UL U305 procedures. In accordance with UL U305, gypsum board of some embodiments constructed in an assembly is subjected to fire endurance testing according to U305 for 30 minutes, at which time it is pulled from the heating environment and moved to another location for the hose stream test according to U305. The assembly is subjected to a stream of water from a fire hose equipped to send the water out at about 30 psi water pressure for a sixty second duration.

By extension, gypsum board formed according to principles of some embodiments of the present disclosure can be used in assemblies that are effective to inhibit the transmission of heat there through to meet the one-hour fire-resistance rating to be classified as Type X board under ASTM 1396/C 1396M-06. In other embodiments, assemblies can be constructed using gypsum board formed according to principles of the present disclosure that conform to the specification of other UL assemblies, such as UL U419 and U423, for example. In yet other embodiments, gypsum board formed according to principles of the present disclosure can be used in other assemblies that are substantially equivalent to at least one of U305, U419, and U423. Such assemblies can pass the one-hour fire rating and applicable hose stream testing for U305, U419, U423, and other equivalent fire test procedures in accordance with some embodiments.

In some embodiments, the High Temperature Shrinkage according to ASTM C1795-15 of the gypsum board typically is about 5% or less in the x-y directions (width-length), e.g., about 4% or less, about 3% or less, about 2% or less, about 1% or less, about 0.5% or less, etc.

With respect to the thickness of the board, i.e., the z-direction, the board can shrink to a relatively small degree (e.g., about 10% or less), or even expand (e.g., from about 0.1% to about 25%) according to various embodiments. As defined herein, it will be understood that a thickness shrinkage of less than a particular amount (e.g., less than about 10%) would encompass the situation where there is thickness expansion.

Thus, in some embodiments, the High Temperature Shrinkage of the gypsum board in the z-direction can be about 10% or less, e.g., about 9% or less, about 8% or less, about 7% or less, about 5% or less, about 3% or less, about 2% or less, about 1% or less, etc. For example, the High Temperature Shrinkage of the gypsum board in the z-direction can be from about 0.1% to about 10%, e.g., from about 0.1% to about 9%, from about 0.1% to about 8%, from about 0.1% to about 7%, from about 0.1% to about 5%, from about 0.5% to about 10%, from about 0.5% to about 5%, from about 1% to about 10%, from about 1% to about 8%, from about 1% to about 5%, from about 5% to about 10%, or from about 5% to about 8%.

In some embodiments, the board does not shrink in the z-direction, but actually desirably expands to counteract shrinkage of, e.g., set gypsum in the board. For example, the board can expand in the z-direction when tested according to ASTM C1795-15 (referred to herein as High Temperature Thickness Expansion in the z-direction) of at least about 0.1% (e.g., at least about 0.5%, at least about 3%, at least about 5%, at least about 10%, or at least about 20%) when heated to about 1560° F. (850° C.) according to ASTM C1795-15. For example, in some embodiments, the High Temperature Thickness Expansion in the z-direction (thickness) is from about 0.1% to about 25%, e.g., from about 0.1% to about 5%, from about 0.1% to about 10%, from about 5% to about 15%, from about 7% to about 20%, from about 10% to about 15%, from about 10% to about 25%, or from about 12% to about 25%. In some embodiments, when used in wall or other assemblies, such assemblies have fire testing performance comparable to assemblies made with heavier, denser commercial fire rated board.

With respect to composite gypsum board in accordance with some embodiments, board that has a High Temperature Shrinkage of about 10% or less in the z direction or an expansion of at least about 0.1% in the z direction indicates that the board will pass one or more fire tests according to ASTM E119 using the assemblies constructed according to UL U305, U419, and U423, and the board will thus be fire-rated.

"Shrink resistance" is a measure of the proportion or percentage of the x-y (width-length) area of a segment of core that remains after the core is heated to a defined temperature over a defined period of time (see, e.g., U.S. Pat. No. 3,616,173). In some embodiments, a gypsum board formed according to principles of some embodiments of the present disclosure, and the methods for making same, can provide a board that exhibits an average shrink resistance of about 85% or greater (e.g., about 90% or greater, or about 95% or greater) when heated at about 1560° F. (850° C.) for one hour in accordance with ASTM C1795-15. In other embodiments, the gypsum board exhibits an average shrink resistance of about 75% or greater (e.g., about 80% or greater) when heated at about 1560° F. (850° C.) for one hour in accordance with ASTM C1795-15.

The coating on the back cover sheet of some embodiments can be effective to provide a Thermal Insulation Index (TI) of about 17 minutes or greater, e.g., about 20 minutes or greater, in accordance with ASTM C1795-15. The gypsum layers can have any suitable density (D), e.g., as described herein. In some embodiments, the gypsum board has a reduced density, e.g., about 40 pcf or less, about 39 pcf or less, about 38 pcf or less, about 37 pcf or less, about 36 pcf or less, about 35 pcf or less, etc.). Some embodiments of the present disclosure allow for suitable fire resistance properties at such lower densities. The coating on the back cover sheet can be effective in some embodiments to provide the gypsum board or any layer therein with a ratio of TI/D of about 0.6 minutes/pounds per cubic foot (about 0.038 minutes/(kg/m$^3$)) or more.

The board can have any desired thickness, such as from about 0.25 inch to about one inch (e.g., about 0.25 inch, about 0.375 inch, about 0.5 inch, about 0.625 inch, about 0.75 inch, about one inch, etc.). Desirably, the board has good strength as described herein, such as an average gypsum layer hardness of at least about 11 pounds (5 kg), e.g., at least about 13 pounds (5.9 kg), or at least about 15 pounds (6.8 kg).

In some embodiments, the board has a nominal thickness of about ⅝ inch. For example, the gypsum board in some embodiments is effective to inhibit the transmission of heat through an assembly constructed in accordance with any one of UL Design Numbers U305, U419 or U423, the assembly having a first side with a single layer of gypsum boards and a second side with a single layer of gypsum boards. ASTM E119-09a involves placing thermocouples in numerous places throughout a particular assembly. The thermocouples then monitor temperature as the assembly is exposed to heat over time. In this respect, surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a. ASTM E119 specifies that the assembly fails the test if any of the thermocouples exceeds a certain preset temperature (ambient plus 325° F.), or if the average of the temperatures from the thermocouples exceeds a different preset temperature (ambient plus 250° F.).

In some embodiments of gypsum board, when heated, the maximum single value of the temperature sensors is less than about 325° F. plus ambient temperature after about 50 minutes, and/or or the average value of the temperature sensors is less than about 250° F. plus ambient temperature after about 50 minutes. In some embodiments, the board has a density of about 40 pounds per cubic foot or less.

In some embodiments, when the surfaces on the first side of the assembly of gypsum board are heated, the maximum single value of the temperature sensors is less than about 325° F. plus ambient temperature after about 55 minutes, and/or the average value of the temperature sensors is less than about 250° F. plus ambient temperature after about 55 minutes. In other embodiments, when the surfaces of gypsum board on the first side of the assembly are heated, the maximum single value of the temperature sensors is less than about 325° F. plus ambient temperature after about 60 minutes and/or the average value of the temperature sensors is less than about 250° F. plus ambient temperature after about 60 minutes. In other embodiments, when the surfaces of gypsum board on the first side of the assembly are heated, the maximum single value of the temperature sensors is less than about 325° F. plus ambient temperature after about 50 minutes, and/or the average value of the temperature sensors is less than about 250° F. plus ambient temperature after about 50 minutes. In other embodiments, when the surfaces of gypsum board on the first side of the assembly are heated, the maximum single value of the temperature sensors is less than about 325° F. plus ambient temperature after about 55 minutes, and/or the average value of the temperature sensors is less than about 250° F. plus ambient temperature after about 55 minutes. In other embodiments, when the surfaces of gypsum board on the first side of the assembly are heated, the maximum single value of the temperature sensors is less than about 325° F. plus ambient temperature after about 60 minutes, and the average value of the temperature sensors is less than about 250° F. plus ambient temperature after about 60 minutes.

In some embodiments, the gypsum board is effective to inhibit the transmission of heat through the assembly when constructed in accordance with UL Design Number U305 so as to achieve a one hour fire rating under ASTM E119-09a. In some embodiments, the board is effective to inhibit the transmission of heat through the assembly when constructed in accordance with UL Design Number U419 so as to achieve a one hour fire rating under ASTM E119-09a. In some embodiments, the gypsum board is effective to inhibit the transmission of heat through the assembly when constructed in accordance with UL Design Number U423 so as to achieve a one hour fire rating under ASTM E119-09a. In some embodiments, the board has a Thermal Insulation Index (TI) of about 20 minutes or greater and/or a High Temperature Shrinkage (S) of about 10% or less, in accordance with ASTM C1795-15. In some embodiments, the board has a ratio of High Temperature Thickness Expansion (TE) to S (TEIS) of about 0.06 or more, such as about 0.2 or more.

In some embodiments, gypsum board made according to the disclosure meets strength test protocols according to ASTM Standard C473-10. For example, in some embodiments, when the board is cast at a thickness of ½ inch, the board has a nail pull resistance of at least about 65 $lb_f$ (pounds force, which is sometimes referred to as simply "lb" or "lbs" for convenience by those of ordinary skill in the art, who understand this is a measurement of force) as determined according to ASTM C473-10 (method B), e.g., at least about 68 $lb_f$, at least about 70 $lb_f$, at least about 72 $lb_f$, at least about 74 $lb_f$, at least about 75 $lb_f$, at least about 76 $lb_f$, at least about 77 $lb_f$, etc. In various embodiments, the nail pull resistance can be from about 65 $lb_f$ to about 100 $lb_f$, from about 65 $lb_f$ to about 95 $lb_f$, from about 65 $lb_f$ to about 90 $lb_f$, from about 65 $lb_f$ to about 85 $lb_f$, from about 65 $lb_f$ to about 80 $lb_f$, from about 65 $lb_f$ to about 75 $lb_f$, from about 68 $lb_f$ to about 100 $lb_f$, from about 68 $lb_f$ to about 95 $lb_f$, from about 68 $lb_f$ to about 90 $lb_f$, from about 68 $lb_f$ to about 85 $lb_f$, from about 68 $lb_f$ to about 80 $lb_f$, from about 70 $lb_f$ to about 100 $lb_f$, from about 70 $lb_f$ to about 95 $lb_f$, from about 70 $lb_f$ to about 90 $lb_f$, from about 70 $lb_f$ to about 85 $lb_f$, from about 70 $lb_f$ to about 80 $lb_f$, from about 72 $lb_f$ to about 100 $lb_f$, from about 72 $lb_f$ to about 95 $lb_f$, from about 72 $lb_f$ to about 90 $lb_f$, from about 72 $lb_f$ to about 85 $lb_f$, from about 72 $lb_f$ to about 80 $lb_f$, from about 72 $lb_f$ to about 77 $lb_f$, from about 72 $lb_f$ to about 75 $lb_f$, from about 75 $lb_f$ to about 100 $lb_f$, from about 75 $lb_f$ to about 95 $lb_f$, from about 75 $lb_f$ to about 90 $lb_f$, from about 75 $lb_f$ to about 85 $lb_f$, from about 75 $lb_f$ to about 80 $lb_f$, from about 75 $lb_f$ to about 77 $lb_f$, from about 77 $lb_f$ to about 100 $lb_f$, from about 77 $lb_f$ to about 95 $lb_f$, from about 77 $lb_f$ to about 90 $lb_f$, from about 77 $lb_f$ to about 85 $lb_f$, or from about 77 $lb_f$ to about 80 $lb_f$.

With respect to flexural strength, in some embodiments, when cast in a board of one-half inch thickness, the board has a flexural strength of at least about 36 $lb_f$ in a machine direction (e.g., at least about 38 $lb_f$, at least about 40 $lb_f$, etc.) and/or at least about 107 $lb_f$ (e.g., at least about 110 $lb_f$, at least about 112 $lb_f$, etc.) in a cross-machine direction as determined according to the ASTM standard C473-10, method B. In various embodiments, the board can have a flexural strength in a machine direction of from about 36 $lb_f$ to about 60 $lb_f$, e.g., from about 36 $lb_f$ to about 55 $lb_f$, from about 36 $lb_f$ to about 50 $lb_f$, from about 36 $lb_f$ to about 45 $lb_f$, from about 36 $lb_f$ to about 40 $lb_f$, from about 36 $lb_f$ to about 38 $lb_f$, from about 38 $lb_f$ to about 60 $lb_f$, from about 38 $lb_f$ to about 55 $lb_f$, from about 38 $lb_f$ to about 50 $lb_f$, from about 38 $lb_f$ to about 45 $lb_f$, from about 38 $lb_f$ to about 40 $lb_f$, from about 40 $lb_f$ to about 60 $lb_f$, from about 40 $lb_f$ to about 55 $lb_f$, from about 40 $lb_f$ to about 50 $lb_f$, or from about 40 $lb_f$ to about 45 $lb_f$. In various embodiments, the board can have a flexural strength in a cross-machine direction of from about 107 $lb_f$ to about 130 $lb_f$, e.g., from about 107 $lb_f$ to about 125 $lb_f$, from about 107 $lb_f$ to about 120 $lb_f$, from about 107 $lb_f$ to about 115 $lb_f$, from about 107 $lb_f$ to about 112 $lb_f$, from about 107 $lb_f$ to about 110 $lb_f$, from about 110 $lb_f$ to about 130 $lb_f$, from about 110 $lb_f$ to about 125 $lb_f$, from about 110 $lb_f$ to about 120 $lb_f$, from about 110 $lb_f$ to about 115 $lb_f$, from about 110 $lb_f$ to about 112 $lb_f$, from about 112 $lb_f$ to about 130 $lb_f$, from about 112 $lb_f$ to about 125 $lb_f$, from about 112 $lb_f$ to about 120 $lb_f$, or from about 112 $lb_f$ to about 115 $lb_f$.

In addition, in some embodiments, board can have an average gypsum layer hardness of at least about 11 $lb_f$, e.g., at least about 12 $lb_f$, at least about 13 $lb_f$, at least about 14 $lb_f$, at least about 15 $lb_f$, at least about 16 $lb_f$, at least about 17 $lb_f$, at least about 18 $lb_f$, at least about 19 $lb_f$, at least about 20 $lb_f$, at least about 21 $lb_f$, or at least about 22 $lb_f$, as determined according to ASTM C473-10, method B. In some embodiments, board can have an average gypsum layer hardness of from about 11 $lb_f$ to about 25 $lb_f$, e.g., from about 11 $lb_f$ to about 22 $lb_f$, from about 11 $lb_f$ to about 21 $lb_f$, from about 11 $lb_f$ to about 20 $lb_f$, from about 11 $lb_f$ to about 19 $lb_f$, from about 11 $lb_f$ to about 18 $lb_f$, from about 11 $lb_f$ to about 17 $lb_f$, from about 11 $lb_f$ to about 16 $lb_f$, from about 11 $lb_f$ to about 15 $lb_f$, from about 11 $lb_f$ to about 14 $lb_f$, from about 11 $lb_f$ to about 13 $lb_f$, from about 11 $lb_f$ to about 12 $lb_f$, from about 12 $lb_f$ to about 25 $lb_f$, from about 12 $lb_f$ to about 22 $lb_f$, from about 12 $lb_f$ to about 21 $lb_f$, from about 12 $lb_f$ to about 20 $lb_f$, from about 12 $lb_f$ to about 19 $lb_f$, from about 12 $lb_f$ to about 18 $lb_f$, from about 12 $lb_f$ to about 17 $lb_f$, from about 12 $lb_f$ to about 16 $lb_f$, from about 12 $lb_f$ to about 15 $lb_f$, from about 12 $lb_f$ to about 14 $lb_f$, from about 12 $lb_f$ to about 13 $lb_f$, from about 13 $lb_f$ to about 25 $lb_f$, from about 13 $lb_f$ to about 22 $lb_f$, from about 13 $lb_f$ to about 21 $lb_f$, from about 13 $lb_f$ to about 20 $lb_f$, from about 13 $lb_f$ to about 19 $lb_f$, from about 13 $lb_f$ to about 18 $lb_f$, from about 13 $lb_f$ to about 17 $lb_f$, from about 13 $lb_f$ to about 16 $lb_f$, from about 13 $lb_f$ to about 15 $lb_f$, from about 13 $lb_f$ to about 14 $lb_f$, from about 14 $lb_f$ to about 25 $lb_f$, from about 14 $lb_f$ to about 22 $lb_f$, from about 14 $lb_f$ to about 21 $lb_f$, from about 14 $lb_f$ to about 20 $lb_f$, from about 14 $lb_f$ to about 19 $lb_f$, from about 14 $lb_f$ to about 18 $lb_f$, from about 14 $lb_f$ to about 17 $lb_f$, from about 14 $lb_f$ to about 16 $lb_f$, from about 14 $lb_f$ to about 15 $lb_f$, from about 15 $lb_f$ to about 25 $lb_f$, from about 15 $lb_f$ to about 22 $lb_f$, from about 15 $lb_f$ to about 21 $lb_f$, from about 15 $lb_f$ to about 20 $lb_f$, from about 15 $lb_f$ to about 19 $lb_f$, from about 15 $lb_f$ to about 18 $lb_f$, from about 15 $lb_f$ to about 17 $lb_f$, from about 15 $lb_f$ to about 16 $lb_f$, from about 16 $lb_f$ to about 25 $lb_f$, from about 16 $lb_f$ to about 22 $lb_f$, from about 16 $lb_f$ to about 21 $lb_f$, from about 16 $lb_f$ to about 20 $lb_f$, from about 16 $lb_f$ to about 19 $lb_f$, from about 16 $lb_f$ to about 18 $lb_f$, from about 16 $lb_f$ to about 17 $lb_f$, from about 17 $lb_f$ to about 25 $lb_f$, from about 17 $lb_f$ to about 22 $lb_f$, from about 17 $lb_f$ to about 21 $lb_f$, from about 17 $lb_f$ to about 20 $lb_f$, from about 17 $lb_f$ to about 19 $lb_f$, from about 17 $lb_f$ to about 18 $lb_f$, from about 18 $lb_f$ to about 25 $lb_f$, from about 18 $lb_f$ to about 22 $lb_f$, from about 18 $lb_f$ to about 21 $lb_f$, from about 18 lb$_f$ to about 20 lb$_f$, from about 18 lb$_f$ to about 19 lb$_f$, from about 19 lb$_f$ to about 25 lb$_f$, from about 19 lb$_f$ to about 22 lb$_f$, from about 19 lb$_f$ to about 21 lb$_f$, from about 19 lb$_f$ to about 20 lb$_f$, from about 21 lb$_f$ to about 25 lb$_f$, from about 21 lb$_f$ to about 22 lb$_f$, or from about 22 lb$_f$ to about 25 lb$_f$.

The invention is further illustrated by the following exemplary clauses. However, the invention is not limited by the following clauses.

(Clause 1) A composite gypsum board, coating composition, or method of making gypsum board, as described herein.

(Clause 2) A composite gypsum board comprising a gypsum layer disposed between a face and back cover sheet, the gypsum layer comprising a crystalline matrix of set gypsum; a coating disposed on an outer surface of the back cover sheet, the coating formed from a composition comprising an alkaline silicate, a solid filler, and optionally a borate; the gypsum board having at least one of the following when the board is tested at a thickness of ⅝ (0.625) inch: a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and/or where, when the board is cast at a nominal thickness of ⅝-inch, an assembly is constructed in accordance with any one of UL Design Numbers U305, U419 or U423, the assembly having a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after about 60 minutes; or an average value of the temperature sensors is less than about 250° F. plus ambient temperature after about 60 minutes.

(Clause 3) The composite gypsum board of clause 2, having a density of about 40 pcf or less.

(Clause 4) The composite gypsum board of clause 2 or 3, having a density of about 37 pcf or less.

(Clause 5) The composite gypsum board of any one of clauses 2-4, wherein the alkaline silicate is a sodium silicate, a potassium silicate, a lithium silicate, or any combination thereof.

(Clause 6) The composite gypsum board of any one of clauses 2-5, wherein the alkaline silicate is a sodium silicate.

(Clause 7) The composite gypsum board of any one of clauses 2-6, wherein the sodium silicate is a solid.

(Clause 8) The composite gypsum board of any one of clauses 2-7, wherein the sodium silicate is a liquid (water-glass).

(Clause 9) The composite gypsum board of any one of clauses 2-8, wherein the solid filler is mica, clay, wollastonite, magnesite, perlite, talc, bentonite, limestone, gypsum, zinc oxide, zinc sulfate, hollow beads, zeolites, fly ash, bottom ash, coal ash, steel slag, iron slag, limestone slag. For example, in some embodiments the solid filler is mica, limestone, clay, wollastonite, magnesite, perlite, fly ash, slag, or any combination thereof.

(Clause 10) The composite gypsum board of any one of clauses 2-9, wherein the borate is present and is sodium metaborate, sodium tetraborate, potassium tetraborate, potassium pentaborate, ammonium pentaborate, borax decahydrate, boric oxide, or any combination thereof.

(Clause 11) The composite gypsum board of any one of clauses 2-10, wherein the composition is substantially free of a latex compound such as polyvinyl acetate, styrene butadiene, polyvinyl alcohol, or polyethylene.

(Clause 12) The composite gypsum board of any one of clauses 2-11, wherein the composition is substantially free of a magnesium compound such as magnesium chloride or magnesium oxide.

(Clause 13) The composite gypsum board of any one of clauses 2-12, wherein, at a nominal thickness of about ⅝-inch, the composite gypsum board has a nail pull resistance of at least about 72 lb, the nail pull resistance determined according to ASTM C473-10.

(Clause 14) The composite gypsum board of any one of clauses 2-13, wherein the gypsum layer is formed from a slurry comprising stucco, water, and foaming agent.

(Clause 15) The composite gypsum board of clause 14, wherein the slurry comprises a strength-enhancing starch.

(Clause 16) The composite gypsum board of clause 15, wherein the starch comprises a pregelatinized starch.

(Clause 17) The composite gypsum board of clause 16, wherein the pregelatinized starch has a viscosity of from about 20 centipoise to about 500 centipoise, as measured according to the VMA test.

(Clause 18) The composite gypsum board of any one of clauses 15-17, wherein the starch comprises an uncooked starch.

(Clause 19) The composite gypsum board of clause 18, wherein the uncooked starch has a peak viscosity of from about 120 Brabender Units to about 900 Brabender units when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

(Clause 20) The composite gypsum board of any one of clauses 14-19, wherein the slurry comprises a polyphosphate.

(Clause 21) The composite gypsum board of clause 20, wherein the polyphosphate is sodium trimetaphosphate.

(Clause 22) The composite gypsum board of any one of clauses 14-21, wherein the slurry comprises a dispersant.

(Clause 23) The composite gypsum board of any one of clauses 14-22, wherein the slurry comprises high expansion particles in an amount of up to about 10% by weight of stucco, said particles having a volume expansion of about 300% or more of their original volume after being heated for about one hour at about 1560° F. (850° C.).

(Clause 24) The composite gypsum board of clause 23, wherein the high expansion particles are high expansion vermiculite particles.

(Clause 25) The composite gypsum board of clause 23 or clause 24, wherein the high expansion particles are present in an amount of up to about 10% by weight of stucco.

(Clause 26) The composite gypsum board of any one of clauses 14-25, the slurry further comprising expandable graphite.

(Clause 27) The composite gypsum board of any one of clauses 2-26, wherein the back cover sheet is formed from paper.

(Clause 28) The composite gypsum board of any one of clauses 2-27, wherein both cover sheets are formed from paper.

(Clause 29) The composite gypsum board of any one of clauses 2-28, further comprising an enhancing layer disposed, directly or indirectly, on the outer surface of the back cover sheet, the enhancing layer formed from a composition comprising a mild acidic material in aqueous solution and a solid filler additive, the mild acid material containing calcium chloride, aluminum sulfate, phosphoric acid, aluminum chloride, magnesium chloride, acetic acid, or any combination thereof; and the solid filler additive containing mica, calcite, clay, wollastonite, magnesite, perlite, talc, bentonite, limestone, gypsum, zinc oxide, zinc sulfate, hollow beads, zeolites, fly ash, bottom ash, coal ash, steel slag, iron slag, limestone slag. For example, in some embodiments the solid filler is limestone, calcium carbonate, clay, mica, magnesite, perlite, fly ash, slag, or any combination thereof.

(Clause 30) The composite gypsum board of any one of clauses 2-29, wherein the board has a High Temperature Shrinkage (S) of about 10% or less in the z direction when heated to about 1560° F. (850° C.), according to ASTM C1795-15; and a High Temperature Shrinkage (S) of about 10% or less in the x-y directions (width-length) when heated to about 1560° F. (850° C.) according to ASTM C1795-15.

(Clause 31) The composite gypsum board of any one of clauses 2-30, wherein the board has a High Temperature Shrinkage (S) of about 10% or less in the z direction when heated to about 1560° F. (850° C.), according to ASTM C1795-15; and a Thermal Insulation Index (TI) of about 20 minutes or greater according to ASTM C1795-15.

(Clause 32) The composite gypsum board of any one of clauses 2-31, wherein the board has a High Temperature Shrinkage (S) of about 10% or less in the z direction when heated to about 1560° F. (850° C.), according to ASTM C1795-15; and a High Temperature Thickness Expansion in the z direction of at least about 0.1% when thickness is evaluated according to the analogous techniques and methodology of ASTM C1795-15.

(Clause 33) The composite gypsum board of any one of clauses 2-32, wherein the board has a High Temperature Shrinkage (S) of about 10% or less in the z direction when heated to about 1560° F. (850° C.), according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 34) The composite gypsum board of any one of clauses 2-33, wherein the board has a High Temperature Shrinkage (S) of about 10% or less in the x-y directions (width-length) when heated to about 1560° F. (850° C.) according to ASTM C1795-15; and a Thermal Insulation Index (TI) of about 20 minutes or greater according to ASTM C1795-15.

(Clause 35) The composite gypsum board of any one of clauses 2-34, wherein the board has a High Temperature Shrinkage (S) of about 10% or less in the x-y directions (width-length) when heated to about 1560° F. (850° C.) according to ASTM C1795-15; and a High Temperature Thickness Expansion in the z direction of at least about 0.1% when thickness is evaluated according to the analogous techniques and methodology of ASTM C1795-15.

(Clause 36) The composite gypsum board of any one of clauses 2-35, wherein the board has a High Temperature Shrinkage (S) of about 10% or less in the x-y directions (width-length) when heated to about 1560° F. (850° C.) according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 37) The composite gypsum board of any one of clauses 2-36, wherein the board has a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

(Clause 38) The composite gypsum board of any one of clauses 2-37, wherein the board has a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 39) The composite gypsum board of any one of clauses 2-38, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; and a Thermal Insulation Index (TI) of about 20 minutes or greater according to ASTM C1795-15.

(Clause 40) The composite gypsum board of any one of clauses 2-39, wherein the board has a High Temperature Shrinkage (S) of about 10% or less in the z direction when heated to about 1560° F. (850° C.), according to ASTM C1795-15; a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

(Clause 41) The composite gypsum board of any one of clauses 2-40, wherein the board has a High Temperature Shrinkage (S) of about 10% or less in the z direction when heated to about 1560° F. (850° C.), according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 42) The composite gypsum board of any one of clauses 2-41, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; and a High Temperature Thickness Expansion in the z direction of at least about 0.1% when thickness is evaluated according to the analogous techniques and methodology of ASTM C1795-15.

(Clause 43) The composite gypsum board of any one of clauses 2-42, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 44) The composite gypsum board of any one of clauses 2-43, wherein the board has a High Temperature Shrinkage (S) of about 10% or less in the z direction when heated to about 1560° F. (850° C.), according to ASTM C1795-15; a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 45) The composite gypsum board of any one of clauses 2-44, wherein the board has a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

(Clause 46) The composite gypsum board of any one of clauses 2-45, wherein the board has a High Temperature Shrinkage (S) of about 10% or less in the x-y directions (width-length) when heated to about 1560° F. (850° C.) according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 47) The composite gypsum board of any one of clauses 2-46, wherein the board has a High Temperature Shrinkage (S) of about 10% or less in the x-y directions (width-length) when heated to about 1560° F. (850° C.)

according to ASTM C1795-15; a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 48) The composite gypsum board of any one of clauses 2-47, wherein the board has a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 49) The composite gypsum board of any one of clauses 2-48, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

(Clause 50) The composite gypsum board of any one of clauses 2-49, wherein the board has a High Temperature Shrinkage (S) of about 10% or less in the z direction when heated to about 1560° F. (850° C.), according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 51) The composite gypsum board of any one of clauses 2-50, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 52) The composite gypsum board of any one of clauses 2-51, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 53) The composite gypsum board of any one of clauses 2-52, wherein the board has a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 54) The composite gypsum board of any one of clauses 2-53, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 55) A method of making gypsum board comprising: (a) mixing at least water and stucco to form a slurry; (b) disposing the slurry between a face cover sheet and a back cover sheet to form a board precursor; (c) cutting the board precursor into a board; (d) drying the board; and (e) applying a coating composition on an outer surface of the back cover sheet, the coating composition comprising an alkaline silicate, a solid filler, and optionally a borate; wherein the gypsum board has at least one of the following when the board is tested at a thickness of ⅝ (0.625) inch: a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and/or where, when the board is cast at a nominal thickness of ⅝-inch, an assembly is constructed in accordance with any one of UL Design Numbers U305, U419 or U423, the assembly having a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after about 60 minutes; or an average value of the temperature sensors is less than about 250° F. plus ambient temperature after about 60 minutes.

(Clause 56) The method of clause 55, having a density of about 40 pcf or less.

(Clause 57) The method of clause 55 or 56, having a density of about 37 pcf or less.

(Clause 58) The method of any one of clauses 55-57, wherein the alkaline silicate is a sodium silicate, a potassium silicate, a lithium silicate, or any combination thereof.

(Clause 59) The method of any one of clauses 55-58, wherein the alkaline silicate is a sodium silicate.

(Clause 60) The method of any one of clauses 55-59, wherein the sodium silicate is a solid.

(Clause 61) The method of any one of clauses 55-60, wherein the sodium silicate is a liquid (waterglass).

(Clause 62) The method of any one of clauses 55-61, wherein the solid filler is mica, clay, wollastonite, magnesite, perlite, talc, bentonite, limestone, gypsum, zinc oxide, zinc sulfate, hollow beads, zeolites, fly ash, bottom ash, coal ash, steel slag, iron slag, limestone slag. For example, in some embodiments the solid filler is mica, limestone, clay, wollastonite, magnesite, perlite, fly ash, slag, or any combination thereof.

(Clause 63) The method of any one of clauses 55-62, wherein the borate is present and is sodium metaborate, sodium tetraborate, potassium tetraborate, potassium pentaborate, ammonium pentaborate, borax decahydrate, boric oxide, or any combination thereof.

(Clause 64) The method of any one of clauses 55-63, wherein the composition is substantially free of a latex compound such as polyvinyl acetate, styrene butadiene, polyvinyl alcohol, or polyethylene.

(Clause 65) The method of any one of clauses 55-64, wherein the composition is substantially free of a magnesium compound such as magnesium chloride or magnesium oxide.

(Clause 66) The method of any one of clauses 55-65, wherein, at a nominal thickness of about ⅝-inch, the composite gypsum board has a nail pull resistance of at least about 72 lb, the nail pull resistance determined according to ASTM C473-10.

(Clause 67) The method of any one of clauses 55-66, wherein the gypsum layer is formed from a slurry comprising stucco, water, and foaming agent.

(Clause 68) The method of clause 67, wherein the slurry comprises a strength-enhancing starch.

(Clause 69) The method of clause 68, wherein the starch comprises a pregelatinized starch.

(Clause 70) The method of clause 69, wherein the pregelatinized starch has a viscosity of from about 20 centipoise to about 500 centipoise, as measured according to the VMA test.

(Clause 71) The method of any one of clauses 68-70, wherein the starch comprises an uncooked starch.

(Clause 72) The method of clause 71, wherein the uncooked starch has a peak viscosity of from about 120 Brabender Units to about 900 Brabender units when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

(Clause 73) The method of any one of clauses 67-72, wherein the slurry comprises a polyphosphate.

(Clause 74) The method of clause 73, wherein the polyphosphate is sodium trimetaphosphate.

(Clause 75) The method of any one of clauses 67-74, wherein the slurry comprises a dispersant.

(Clause 76) The method of any one of clauses 67-75, wherein the slurry comprises high expansion particles in an amount of up to about 10% by weight of stucco, said particles having a volume expansion of about 300% or more of their original volume after being heated for about one hour at about 1560° F. (850° C.).

(Clause 77) The method of clause 76, wherein the high expansion particles are high expansion vermiculite particles.

(Clause 78) The method of clause 76 or clause 77, wherein the high expansion particles are present in an amount of up to about 10% by weight of stucco.

(Clause 79) The method of any one of clauses 67-78, the slurry further comprising expandable graphite.

(Clause 80) The method of any one of clauses 55-79, wherein the back cover sheet is formed from paper.

(Clause 81) The method of any one of clauses 55-80, wherein both cover sheets are formed from paper.

(Clause 82) The method of any one of clauses 55-81, wherein the coating is applied after the board is dried.

(Clause 83) The method of any one of clauses 55-82, further comprising applying an enhancing layer on the back cover sheet, the enhancing layer formed from a composition comprising a mild acidic material in aqueous solution and a solid filler additive, the mild acid material containing calcium chloride, aluminum sulfate, phosphoric acid, aluminum chloride, magnesium chloride, acetic acid, or any combination thereof; and the solid filler additive containing mica, clay, wollastonite, magnesite, perlite, talc, bentonite, limestone, gypsum, zinc oxide, zinc sulfate, hollow beads, zeolites, fly ash, bottom ash, coal ash, steel slag, iron slag, limestone slag. For example, in some embodiments the solid filler is limestone, calcium carbonate, clay, mica, magnesite, perlite, fly ash, slag, or any combination thereof.

(Clause 84) The method of any one of clauses 55-83, wherein the board has a High Temperature Shrinkage (S) of about 10% or less in the z direction when heated to about 1560° F. (850° C.), according to ASTM C1795-15; and a High Temperature Shrinkage (S) of about 10% or less in the x-y directions (width-length) when heated to about 1560° F. (850° C.) according to ASTM C1795-15.

(Clause 85) The method of any one of clauses 55-84, wherein the board has a High Temperature Shrinkage (S) of about 10% or less in the z direction when heated to about 1560° F. (850° C.), according to ASTM C1795-15; and a Thermal Insulation Index (TI) of about 20 minutes or greater according to ASTM C1795-15.

(Clause 86) The method of any one of clauses 55-85, wherein the board has a High Temperature Shrinkage (S) of about 10% or less in the z direction when heated to about 1560° F. (850° C.), according to ASTM C1795-15; and a High Temperature Thickness Expansion in the z direction of at least about 0.1% when thickness is evaluated according to the analogous techniques and methodology of ASTM C1795-15.

(Clause 87) The method of any one of clauses 55-86, wherein the board has a High Temperature Shrinkage (S) of about 10% or less in the z direction when heated to about 1560° F. (850° C.), according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 88) The method of any one of clauses 55-87, wherein the board has a High Temperature Shrinkage (S) of about 10% or less in the x-y directions (width-length) when heated to about 1560° F. (850° C.) according to ASTM C1795-15; and a Thermal Insulation Index (TI) of about 20 minutes or greater according to ASTM C1795-15.

(Clause 89) The method of any one of clauses 55-88, wherein the board has a High Temperature Shrinkage (S) of about 10% or less in the x-y directions (width-length) when heated to about 1560° F. (850° C.) according to ASTM C1795-15; and a High Temperature Thickness Expansion in the z direction of at least about 0.1% when thickness is evaluated according to the analogous techniques and methodology of ASTM C1795-15.

(Clause 90) The method of any one of clauses 55-89, wherein the board has a High Temperature Shrinkage (S) of about 10% or less in the x-y directions (width-length) when heated to about 1560° F. (850° C.) according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 91) The method of any one of clauses 55-90, wherein the board has a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

(Clause 92) The method of any one of clauses 55-91, wherein the board has a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 93) The method of any one of clauses 55-92, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; and a Thermal Insulation Index (TI) of about 20 minutes or greater according to ASTM C1795-15.

(Clause 94) The method of any one of clauses 55-93, wherein the board has a High Temperature Shrinkage (S) of about 10% or less in the z direction when heated to about 1560° F. (850° C.), according to ASTM C1795-15; a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

(Clause 95) The method of any one of clauses 55-94, wherein the board has a High Temperature Shrinkage (S) of about 10% or less in the z direction when heated to about 1560° F. (850° C.), according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 96) The method of any one of clauses 55-95, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; and a High Temperature Thickness Expansion in the z direction of at least about 0.1% when thickness is evaluated according to the analogous techniques and methodology of ASTM C1795-15.

(Clause 97) The method of any one of clauses 55-96, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 98) The method of any one of clauses 55-97, wherein the board has a High Temperature Shrinkage (S) of about 10% or less in the z direction when heated to about 1560° F. (850° C.), according to ASTM C1795-15; a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 99) The method of any one of clauses 55-98, wherein the board has a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

(Clause 100) The method of any one of clauses 55-99, wherein the board has a High Temperature Shrinkage (S) of about 10% or less in the x-y directions (width-length) when heated to about 1560° F. (850° C.) according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 101) The method of any one of clauses 55-100, wherein the board has a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 102) The method of any one of clauses 55-101, wherein the board has a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 103) The method of any one of clauses 55-102, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

(Clause 104) The method of any one of clauses 55-103, wherein the board has a High Temperature Shrinkage (S) of about 10% or less in the z direction when heated to about 1560° F. (850° C.), according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 105) The method of any one of clauses 55-104, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 106) The method of any one of clauses 55-105, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 107) The method of any one of clauses 55-106, wherein the board has a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 108) The method of any one of clauses 55-107, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 109) A coating composition for application to a cover sheet of a gypsum wallboard, the coating composition comprising an alkaline silicate, a solid filler, and optionally a borate.

(Clause 110) The coating composition of clause 109, wherein the alkaline silicate is a sodium silicate, a potassium silicate, a lithium silicate, or any combination thereof.

(Clause 111) The coating composition of clause 109 or 110, wherein the alkaline silicate is a sodium silicate.

(Clause 112) The coating composition of any one of clauses 109-111, wherein the sodium silicate is a solid.

(Clause 113) The coating composition of any one of clauses 109-112, wherein the sodium silicate is a liquid (waterglass).

(Clause 114) The coating composition of any one of clauses 109-113, wherein the solid filler is mica, clay, wollastonite, magnesite, perlite, talc, bentonite, limestone, gypsum, zinc oxide, zinc sulfate, hollow beads, zeolites, fly ash, bottom ash, coal ash, steel slag, iron slag, limestone slag; such as, in some clauses the solid filler is mica, limestone, clay, wollastonite, magnesite, perlite, fly ash, slag, or any combination thereof.

(Clause 115) The coating composition of clause 64, wherein the solid filler is Natural Mica.

(Clause 116) The coating composition of any one of clauses 109-115, wherein the borate is present and is sodium metaborate, sodium tetraborate, potassium tetraborate, potassium pentaborate, ammonium pentaborate, borax decahydrate, boric oxide, or any combination thereof.

(Clause 117) The coating composition of any one of clauses 109-116, wherein the composition is substantially free of a latex compound such as polyvinyl acetate, styrene butadiene, polyvinyl alcohol, or polyethylene.

(Clause 118) The coating composition of any one of clauses 109-117, wherein the composition is substantially free of a magnesium compound such as magnesium chloride or magnesium oxide.

(Clause 119) The coating composition of any one of clauses 109-118, wherein, when applied to the gypsum wallboard, imparts it with at least one of the following when the board is tested at a thickness of ⅝ (0.625) inch: a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and/or where, when the board is cast at a nominal thickness of ⅝-inch, an assembly is constructed in accordance with any one of UL Design Numbers U305, U419 or U423, the assembly having a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after about 60 minutes; or an average value of the temperature sensors is less than about 250° F. plus ambient temperature after about 60 minutes.

(Clause 120) The coating composition of any one of clauses 109-119, wherein the board has a High Temperature Shrinkage (S) of about 10% or less in the z direction when heated to about 1560° F. (850° C.), according to ASTM C1795-15; and a High Temperature Shrinkage (S) of about 10% or less in the x-y directions (width-length) when heated to about 1560° F. (850° C.) according to ASTM C1795-15.

(Clause 121) The coating composition of any one of clauses 109-120, wherein the board has a High Temperature Shrinkage (S) of about 10% or less in the z direction when heated to about 1560° F. (850° C.), according to ASTM C1795-15; and a Thermal Insulation Index (TI) of about 20 minutes or greater according to ASTM C1795-15.

(Clause 122) The coating composition of any one of clauses 109-121, wherein the board has a High Temperature Shrinkage (S) of about 10% or less in the z direction when heated to about 1560° F. (850° C.), according to ASTM C1795-15; and a High Temperature Thickness Expansion in the z direction of at least about 0.1% when thickness is evaluated according to the analogous techniques and methodology of ASTM C1795-15.

(Clause 123) The coating composition of any one of clauses 109-122, wherein the board has a High Temperature Shrinkage (S) of about 10% or less in the z direction when heated to about 1560° F. (850° C.), according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 124) The coating composition of any one of clauses 109-123, wherein the board has a High Temperature Shrinkage (S) of about 10% or less in the x-y directions (width-length) when heated to about 1560° F. (850° C.) according to ASTM C1795-15; and a Thermal Insulation Index (TI) of about 20 minutes or greater according to ASTM C1795-15.

(Clause 125) The coating composition of any one of clauses 109-124, wherein the board has a High Temperature Shrinkage (S) of about 10% or less in the x-y directions (width-length) when heated to about 1560° F. (850° C.) according to ASTM C1795-15; and a High Temperature Thickness Expansion in the z direction of at least about 0.1% when thickness is evaluated according to the analogous techniques and methodology of ASTM C1795-15.

(Clause 126) The coating composition of any one of clauses 109-125, wherein the board has a High Temperature Shrinkage (S) of about 10% or less in the x-y directions (width-length) when heated to about 1560° F. (850° C.) according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 127) The coating composition of any one of clauses 109-126, wherein the board has a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

(Clause 128) The coating composition of any one of clauses 109-127, wherein the board has a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 129) The coating composition of any one of clauses 109-128, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; and a Thermal Insulation Index (TI) of about 20 minutes or greater according to ASTM C1795-15.

(Clause 130) The coating composition of any one of clauses 109-129, wherein the board has a High Temperature Shrinkage (S) of about 10% or less in the z direction when heated to about 1560° F. (850° C.), according to ASTM C1795-15; a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

(Clause 131) The coating composition of any one of clauses 109-130, wherein the board has a High Temperature Shrinkage (S) of about 10% or less in the z direction when heated to about 1560° F. (850° C.), according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 132) The coating composition of any one of clauses 109-131, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; and a High Temperature Thickness Expansion in the z direction of at least about 0.1% when thickness is evaluated according to the analogous techniques and methodology of ASTM C1795-15.

(Clause 133) The coating composition of any one of clauses 109-132, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 134) The coating composition of any one of clauses 109-133, wherein the board has a High Temperature Shrinkage (S) of about 10% or less in the z direction when heated to about 1560° F. (850° C.), according to ASTM C1795-15; a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 135) The coating composition of any one of clauses 109-134, wherein the board has a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

(Clause 136) The coating composition of any one of clauses 109-135, wherein the board has a High Temperature Shrinkage (S) of about 10% or less in the x-y directions (width-length) when heated to about 1560° F. (850° C.) according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 137) The coating composition of any one of clauses 109-136, wherein the board has a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 138) The coating composition of any one of clauses 109-137, wherein the board has a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 139) The coating composition of any one of clauses 109-138, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

(Clause 140) The coating composition of any one of clauses 109-139, wherein the board has a High Temperature Shrinkage (S) of about 10% or less in the z direction when heated to about 1560° F. (850° C.), according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 141) The coating composition of any one of clauses 109-140, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 142) The coating composition of any one of clauses 109-141, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 143) The coating composition of any one of clauses 109-142, wherein the board has a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

(Clause 144) The coating composition of any one of clauses 109-143, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

It shall be noted that the preceding clauses are exemplary and non-limiting. Other exemplary aspects and combinations are apparent from the entirety of the description herein. It will also be understood by one of ordinary skill in the art that each of these aspects may be used in various combinations with the other aspects provided herein throughout the specification.

The following examples further illustrate the invention but, of course, should not be construed as in any way limiting its scope.

Example 1

This example illustrates the preparation of a wallboard having a back cover sheet coated with an inorganic binder-based coating, and demonstrates that such coated boards perform better with respect to fire resistance than a control board absent the coating.

Three inorganic binder coatings (Formulations A, B and C) were prepared in accordance with the formulations shown in Table 1 (with the amounts listed by wt. % of the composition).

TABLE 1

| Ingredient | Formulation A | Formulation B | Formulation C |
|---|---|---|---|
| Sodium Silicate Solution | 53% | 57% | 55.6% |
| Water | 14% | 8.6% | 11.1% |
| Mica | 5% | 5.7% | 5.6% |
| Wollastonite (NYCO400) | 20% | | 22.2% |
| Calcium Carbonate | | 22.9% | |
| Kaolin Clay | 5% | 5.7% | 5.6% |
| Sodium Tetraborate Pentahydrate | 1.5% | | |

Boards (4'×8'×⅝") were obtained from a manufacturing plant. The boards were in the form of Sheetrock® Brand UltraLight Panels Firecode® X. The boards were cut into a 12"×12" size before applying the coating. The single layer or multiple layers of coating were applied on the back side of the boards. The boards were dried and cured. The preferred temperature is above 350° F. It will be understood that, generally, the curing temperature can be at or near ambient temperature or above the ambient temperature.

A small scale fire test was conducted in accordance with ASTM C1795-15 to study the effect of the inorganic coating on fire resistance. Four samples were tested. They were (i) the control sample without the coating, (ii) Formulation A coated sample, (iii) Formulation B coated sample, and (iv) Formulation C coated sample.

The procedure of the small scale fire test is as follows: Two, 12"×12" coated or uncoated boards are cut to a size of 8.5"×8.5" using a mechanical saw to create clean cut edges. The board faces, exposed and unexposed (to fire), are given 1" markings around the border and center point. The internal sides have their center points marked. Wood studs are attached to the back side of the board using 1" drywall screws. The board should be centered on the 1" markings.

Six thermocouple wires (T1-T6) are used for each test. T1-T4 are placed in the center of each panel started at the fire exposed side. T5 and T6 are attached to the face of the unexposed side of the board all near the center of the board. Several strips of ceramic insulation are placed on the four sides of the throat opening. All of the sides are well sealed. The data meters are activated. The furnace is activated and it is ensured that the thermometers are recording. The test is stopped when T4, T5 and T6 thermocouples read 400° F., which is normally after a duration of about 60-80 minutes. The data meters and the furnace are turned off.

TABLE 2

Table 2. The fire data up to 400° F. from the unexposed side of the control and the coated boards

| Back Coating Formulation | Dry Coating weight (lbs/msf) | Total Board weight (lbs/msf) | T4 to 400° F. | T5 to 400° F. | T6 to 400° F. | Average Time to 400° F. |
|---|---|---|---|---|---|---|
| none | 0 | 1890 | 63.3 | 64.7 | 66.3 | 64.8 |
| A | 90 | 1845 | 74.1 | 78.8 | 82 | 78.3 |

TABLE 2-continued

Table 2. The fire data up to 400° F. from the
unexposed side of the control and the coated boards

| Back Coating Formulation | Dry Coating weight (lbs/msf) | Total Board weight (lbs/msf) | T4 to 400° F. | T5 to 400° F. | T6 to 400° F. | Average Time to 400° F. |
|---|---|---|---|---|---|---|
| B | 90 | 1837 | 80.7 | 74.1 | 78.7 | 77.8 |
| C | 70 | 1823 | 69.8 | 71.1 | 74.5 | 71.8 |

The curves of temperature vs. time from the unexposed side of the boards was recorded and is shown in FIG. 1. It can be seen that the coated boards perform better with respect to fire resistance than the control board.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A gypsum board comprising:
   a gypsum layer disposed between a face and back cover sheet, the gypsum layer comprising set gypsum;
   a coating disposed on an outer surface of the back cover sheet, the coating formed from a composition comprising an alkaline silicate, a solid filler, and optionally a borate;
   an enhancing layer disposed, directly or indirectly, on the outer surface of the back cover sheet, the enhancing layer formed from a composition comprising a mild acidic material in aqueous solution and a second solid filler additive, the mild acid material containing calcium chloride, aluminum sulfate, phosphoric acid, aluminum chloride, magnesium chloride, acetic acid, or any combination thereof and the second solid filler additive containing mica, clay, wollastonite, magnesite, perlite, talc, bentonite, limestone, gypsum, zinc oxide, zinc sulfate, hollow beads, zeolites, fly ash, bottom ash, coal ash, steel slag, iron slag, limestone slag, or any combination thereof, wherein the coating and the enhancing layer are in either order relative to the gypsum layer;
   the gypsum board having a High Temperature Shrinkage (S) of about 10% or less in the z direction when heated to about 1560° F. (850° C.), according to ASTM C1795-15 when the board is tested at a thickness of ⅝ (0.625) inch.

2. The gypsum board of claim 1, wherein the alkaline silicate is a sodium silicate, a potassium silicate, a lithium silicate, or any combination thereof.

3. The gypsum board of claim 1, wherein the alkaline silicate is a sodium silicate.

4. The gypsum board of claim 1, wherein the solid filler is mica, clay, wollastonite, magnesite, perlite, talc, bentonite, limestone, gypsum, zinc oxide, zinc sulfate, hollow beads, zeolites, fly ash, bottom ash, coal ash, steel slag, iron slag, limestone slag, or any combination thereof.

5. The gypsum board of claim 1, wherein the borate is present and is sodium metaborate, sodium tetraborate, potassium tetraborate, potassium pentaborate, ammonium pentaborate, borax decahydrate, boric oxide, or any combination thereof.

6. The gypsum board of claim 1, wherein the gypsum layer is formed from a slurry comprising high expansion particles in an amount of up to about 10% by weight of stucco, said particles having a volume expansion of about 300% or more of their original volume after being heated for about one hour at about 1560° F. (850° C.).

7. The gypsum board of claim 6, the slurry further comprising expandable graphite.

8. The gypsum board of claim 1, the board having a High Temperature Shrinkage (S) of about 10% or less in the x-y directions (width-length) when heated to about 1560° F. (850° C.) according to ASTM C1795-15 when the board is tested at a thickness of ⅝ (0.625) inch.

9. The gypsum board of claim 1, the board having a Thermal Insulation Index (TI) of about 20 minutes or greater according to ASTM C1795-15 when the board is tested at a thickness of ⅝ (0.625) inch.

10. The gypsum board of claim 1, where, when the board is cast at a nominal thickness of ⅝-inch, an assembly is constructed in accordance with any one of UL Design Numbers U305, U419 or U423, the assembly having a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after about 60 minutes; or an average value of the temperature sensors is less than about 250° F. plus ambient temperature after about 60 minutes.

11. A gypsum board comprising:

a gypsum layer disposed between a face and back cover sheet, the gypsum layer comprising set gypsum;

a coating disposed on an outer surface of the back cover sheet, the coating formed from a composition comprising an alkaline silicate, a solid filler, and optionally a borate;

the gypsum board having a High Temperature Shrinkage (S) of about 10% or less in the x-y directions (width-length) when heated to about 1560° F. (850° C.) according to ASTM C1795-15 when the board is tested at a thickness of ⅝ (0.625) inch.

12. The board of claim 11, wherein:

the alkaline silicate is a sodium silicate;

the solid filler is mica, clay, wollastonite, magnesite, perlite, talc, bentonite, limestone, gypsum, zinc oxide, zinc sulfate, hollow beads, zeolites, fly ash, bottom ash, coal ash, steel slag, iron slag, limestone slag, or any combination thereof; and the borate is present and is sodium metaborate, sodium tetraborate, potassium tetraborate, potassium pentaborate, ammonium pentaborate, borax decahydrate, boric oxide, or any combination thereof.

13. The board of claim 12, wherein the board has at least one of the following when the board is tested at a thickness of ⅝ (0.625) inch:

a High Temperature Shrinkage (S) of about 10% or less in the z direction when heated to about 1560° F. (850° C.), according to ASTM C1795-15;

a Thermal Insulation Index (TI) of about 20 minutes or greater according to ASTM C1795-15; and/or where, when the board is cast at a nominal thickness of ⅝-inch, an assembly is constructed in accordance with any one of UL Design Numbers U305, U419 or U423, the assembly having a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after about 60 minutes; or an average value of the temperature sensors is less than about 250° F. plus ambient temperature after about 60 minutes.

14. A method of making gypsum board comprising:

(a) mixing at least water and stucco to form a slurry;

(b) disposing the slurry between a face cover sheet and a back cover sheet to form a board precursor;

(c) cutting the board precursor into a board;

(d) drying the board; and (e) applying a coating composition on an outer surface of the back cover sheet, the coating composition comprising an alkaline silicate, a solid filler, and optionally a borate;

(f) applying an enhancing layer directly or indirectly on the outer surface of the back cover sheet, the enhancing layer formed from a composition comprising a mild acidic material in aqueous solution and a second solid filler additive, the mild acid material containing calcium chloride, aluminum sulfate, phosphoric acid, aluminum chloride, magnesium chloride, acetic acid, or any combination thereof; and the second solid filler additive containing mica, clay, wollastonite, magnesite, perlite, talc, bentonite, limestone, gypsum, zinc oxide, zinc sulfate, hollow beads, zeolites, fly ash, bottom ash, coal ash, steel slag, iron slag, limestone slag, or any combination thereof, wherein the coating and the enhancing layer are in either order relative to the gypsum layer;

wherein the gypsum board has at least one of the following when the board is tested at a thickness of ⅝ (0.625) inch:

a High Temperature Shrinkage (S) of about 10% or less in the z direction when heated to about 1560° F. (850° C.), according to ASTM C1795-15;

a High Temperature Shrinkage (S) of about 10% or less in the x-y directions (width-length) when heated to about 1560° F. (850° C.) according to ASTM C1795-15;

a Thermal Insulation Index (TI) of about 20 minutes or greater according to ASTM C1795-15;

a High Temperature Thickness Expansion in the z direction of at least about 0.1% when thickness is evaluated according to the analogous techniques and methodology of ASTM C1795-15; and/or where, when the board is cast at a nominal thickness of ⅝-inch, an assembly is constructed in accordance with any one of UL Design Numbers U305, U419 or U423, the assembly having a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after about 60 minutes; or an average value of the temperature sensors is less than about 250° F. plus ambient temperature after about 60 minutes.

15. The method of claim 14, wherein the alkaline silicate is a sodium silicate.

16. The method of claim 14, wherein the solid filler is mica, clay, wollastonite, magnesite, perlite, talc, bentonite, limestone, gypsum, zinc oxide, zinc sulfate, hollow beads, zeolites, fly ash, bottom ash, coal ash, steel slag, iron slag, limestone slag, or any combination thereof.

17. The method of claim 14, wherein the borate is present and is sodium metaborate, sodium tetraborate, potassium tetraborate, potassium pentaborate, ammonium pentaborate, borax decahydrate, boric oxide, or any combination thereof.

18. The method of claim 14, wherein the coating is applied after the board is dried.

* * * * *